United States Patent
Kajiura et al.

(10) Patent No.: US 6,563,246 B1
(45) Date of Patent: May 13, 2003

(54) ROTARY ELECTRIC MACHINE FOR ELECTRIC VEHICLE

(75) Inventors: Hiroaki Kajiura, Nagoya (JP); Masahiro Seguchi, Obu (JP)

(73) Assignee: Denso Corporation, Kariya (JP)

( * ) Notice: Subject to any disclaimer, the term of this patent is extended or adjusted under 35 U.S.C. 154(b) by 29 days.

(21) Appl. No.: 09/689,773

(22) Filed: Oct. 13, 2000

(30) Foreign Application Priority Data

| Oct. 14, 1999 | (JP) | 11-292304 |
| May 1, 2000 | (JP) | 2000-132044 |
| May 1, 2000 | (JP) | 2000-132423 |
| Aug. 11, 2000 | (JP) | 2000-243914 |

(51) Int. Cl.[7] .............................................. H02K 19/00
(52) U.S. Cl. .................... 310/162; 310/114; 310/121
(58) Field of Search ........................ 310/162, 166, 310/168, 112, 113, 114, 121

(56) References Cited

U.S. PATENT DOCUMENTS 5,027,023 A * 6/1991 Koiviko ........................ 310/83

FOREIGN PATENT DOCUMENTS

| JP | 7-59310 | 3/1995 |
| JP | 7-143694 | 6/1995 |
| JP | 9-294362 | 11/1997 |
| JP | 10-201148 | 7/1998 |
| JP | 11-89136 | 3/1999 |
| JP | 11-89145 | 3/1999 |
| JP | 11-98721 | 4/1999 |
| JP | 11-136892 | 5/1999 |
| JP | 11-252881 | 9/1999 |
| JP | 11-275789 | 10/1999 |

* cited by examiner

*Primary Examiner*—Thanh Lam
(74) *Attorney, Agent, or Firm*—Oliff & Berridge, PLC

(57) ABSTRACT

A rotary electric machine includes a stator core having a plurality of slots disposed at an inner periphery, an armature winding disposed in the slots and a rotor disposed inside the inner periphery of the stator. The rotor includes a first rotor portion and a second rotor portion, which are disposed magnetically in parallel with each other. The first rotor portion has a plurality of permanent-magnet poles, and a second rotor portion has a plurality of salient induction poles.

9 Claims, 20 Drawing Sheets

PHASE DIFFERENCE 0°

PHASE DIFFERENCE 90°

PHASE DIFFERENCE 180°

ROTARY ELECTRIC MACHINE FOR ELECTRIC VEHICLE

CROSS REFERENCE TO RELATED APPLICATION

The present application is based on and claims priority from Japanese Patent Applications: Hei 11-292304, filed Oct. 14, 1999; 2000-132044, filed May 1, 2000; 2000-132423, filed May 1, 2000; and 2000-243914, filed Aug. 11, 2000, the contents of which are incorporated herein by reference.

BACKGROUND OF THE INVENTION

1. Field of the Invention

The present invention relates to a rotary electric machine to be mounted in an electric vehicle.

2. Description of the Related Art

A synchronous electric rotary machine has been adopted to an electric vehicle or a hybrid vehicle because of its high efficiency and high durability. Such a rotary electric machine, which is known as a brush-less DC motor, preferably employs a permanent-magnet-type rotor because of its simple structure.

The output torque of a synchronous machine is proportional to a product of an amount of the armature current of the motor and a magnetic flux density of the magnetic field formed by permanent magnets. The output torque changes in a sinusoidal curve as a phase angle between the direction of the armature current and the direction of the magnetic field changes.

However, in such a synchronous machine used for a vehicle driving motor, if an A-D converter circuit connected between the armature coil and a battery fails to control the terminal voltage of the armature coil, the phase of armature current can not be controlled. Accordingly, the rotation speed of the permanent-magnet-type rotor becomes so high, that a very high output voltage is generated at the armature coil. This requires a smoothing capacitor and other circuits of a control circuit between the armature coil and the battery to provide means for protecting them from such a high voltage. This increases the size and cost of the smoothing capacitor and other circuits.

SUMMARY OF THE INVENTION

A main object of the invention is to provide an improved rotary electric machine for driving a vehicle that provide an increased torque without requiring a smoothing capacitor and other circuit to provide means for protecting the circuit elements from a very high voltage.

Another object of the invention is to provide a rotary electric machine that includes a permanent-magnet-type rotor and a induction type rotor which does not require any permanent magnet, whereby a volume of the permanent magnets can be reduced. This prevents such an excessively high output voltage even if an A-D converter circuit fails to control the phase current of the armature winding.

According to a feature of the invention, a rotary electric machine includes a stator core having a plurality of slots disposed equally at an inner periphery, an armature winding disposed in the plurality of slots, and a rotor disposed inside the inner periphery of the stator. The rotor includes a first rotor portion and a second rotor portion disposed magnetically in parallel with the first rotor portion. The first rotor portion has a plurality of permanent-magnet poles, and the second rotor portion has a plurality of salient induction poles. In the above structure, the plurality of permanent magnet poles and the plurality of salient induction poles are shifted from each other to provide a maximum combined output torque.

Preferably, the permanent-magnet poles and the salient induction poles are the same in number. This can combine the output torque of both the first and second rotor portions easily and effectively.

It is also preferable that the salient induction pole is disposed at an angle between 0° and 90°, more preferably between 45° and 75°, in electric angle in advance of the permanent-magnet pole.

According to another feature of the invention, each of the permanent-magnet poles has a permanent magnet inserted in an axially extending magnet hole of the first rotor portion.

According to another feature of the invention, the first rotor portion has as many axially extending arc-shaped slit-groups as the number of the permanent-magnet poles formed at the outer periphery thereof at equal intervals and a plurality of permanent magnets respectively inserted into the arc-shaped slit groups. Therefore, the first rotor portion and the second rotor portion can be formed in the same shape. Preferably, each of the permanent-magnet poles has a pair of permanent magnets inserted at opposite ends of one of the holes. Therefore, it is easy to insert permanents magnet into the holes.

According to another feature of the invention, the rotor includes a magnetic shield member disposed between the first and second rotor portions. Therefore, leakage magnetic flux can be reduced. This increases effective magnetic flux and, ultimately, the output torque.

Another object of the invention is to provide a simple and reliable rotary electric machine whose induced voltage can be controlled by a simple actuator.

According to another feature of the invention, a rotary electric machine includes a permanent-magnet-type rotor having a plurality of magnetic poles and a rotor shaft, a magnetically short-circuit mechanism, disposed near the rotor, for magnetically short-circuiting the magnetic poles. The short-circuiting mechanism includes a short-circuiting member and an actuator for moving the short-circuit member relative to the rotor. The short-circuit member may include a short-circuit plate and a member shaft disposed coaxial with the rotor shaft, and the actuator may be a planetary gear mechanism.

According to another feature of the invention, a rotary electric machine includes a stator having a cylindrical stator core and an armature winding, a cylindrical outer rotor portion disposed inside the stator core, an inner rotor portions disposed inside the outer rotor portion, and a relative angle control mechanism. The outer rotor portion has a plurality of permanent-magnet poles, and the relative angle control mechanism controls relative angular position between the outer and inner rotor portions. Preferably, the inner rotor has a plurality of salient induction poles.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
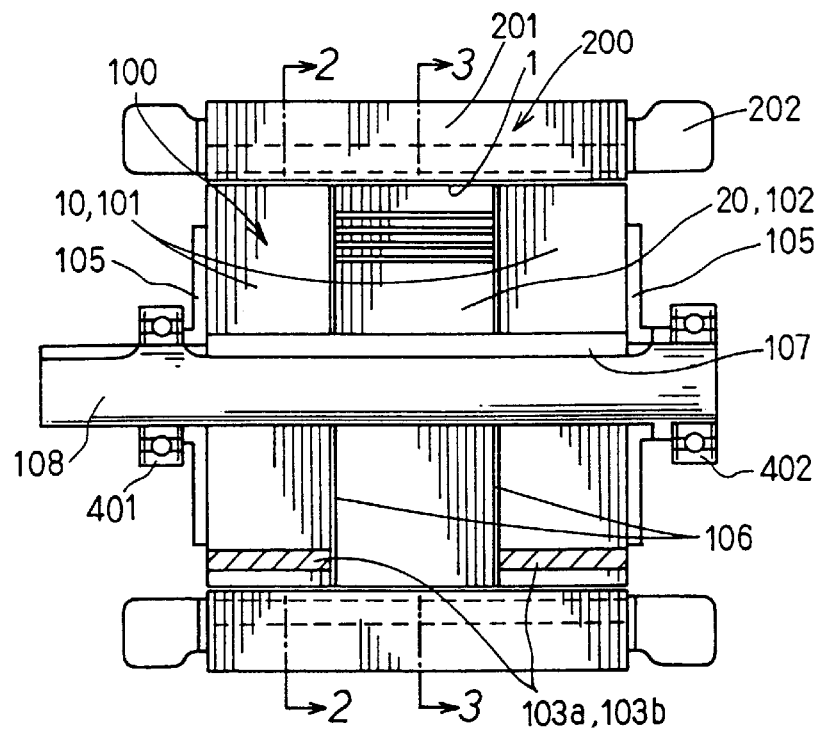
FIG. 1 is a schematic diagram illustrating a rotary electric machine according to a first embodiment of the invention.

A rotary electric machine according to a first embodiment of the invention is described with reference to FIGS. 1–4.

The rotary electric machine is driven by an engine of a hybrid vehicle to generate electric power and is also powered by a battery to start the engine. The rotary electric machine has stator core 201 with armature winding 202 wound thereon and rotor 100 disposed inside stator core 201. Stator core 201 is formed of laminated iron sheets and has a plurality of slots, which respectively accommodate in-slot portions of armature winding 202 as generally indicated by, broken lines, is fixed to a housing (not shown).

Rotor 100 has shaft 108, which is supported by the housing via bearings 401 and 402. Rotor 100 is comprised of first rotor portion 10 and second rotor portion 20. First rotor portion 10 is comprised of a pair of first cores 101, and second rotor portion 20 is comprised of second core 102. Both first and second cores 101 and 102 are formed of laminated iron sheets. The pair of first cores 101 forms a permanent-magnet-type rotor portion, and second core forms a salient-induction-pole-type rotor portion. The pair of first cores 101 and second core 102 are respectively fixed to shaft 108 by means of key 107. Second core 102 is sandwiched by the pair of first cores 101, which is sandwiched by a pair of plates 105, in the axial direction of shaft 108. The pair of plates 105 is also fixed to shaft 108. Nonmagnetic plates 106 is inserted between each of the pair of first cores 101 and second core 102 to magnetically insulate first core 101 and second core 102 from each other.

Figure 2:
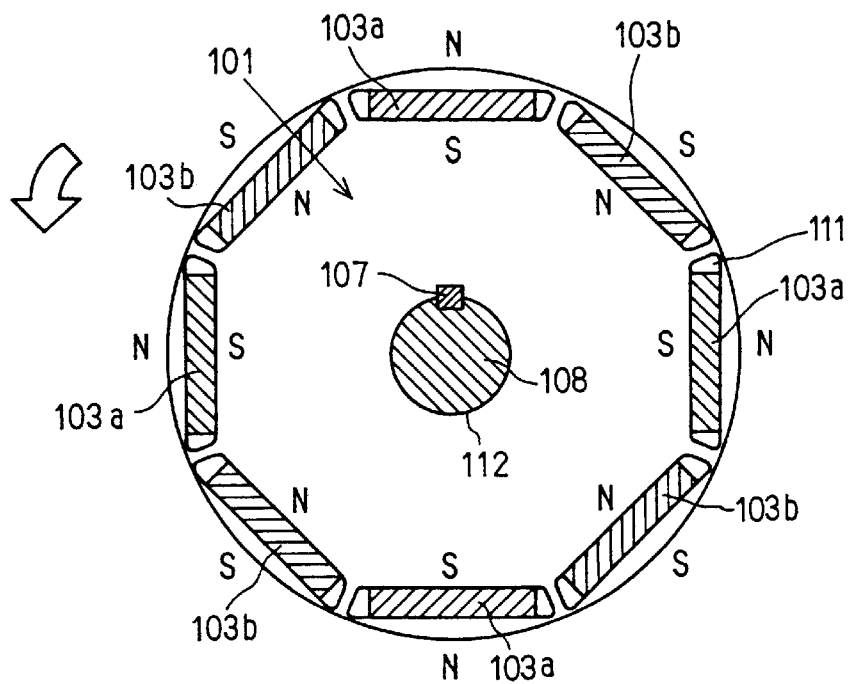
FIG. 2 is a schematic cross-sectional plan view of a first rotor portion of the rotary electric machine according to the first embodiment.
Figure 3:
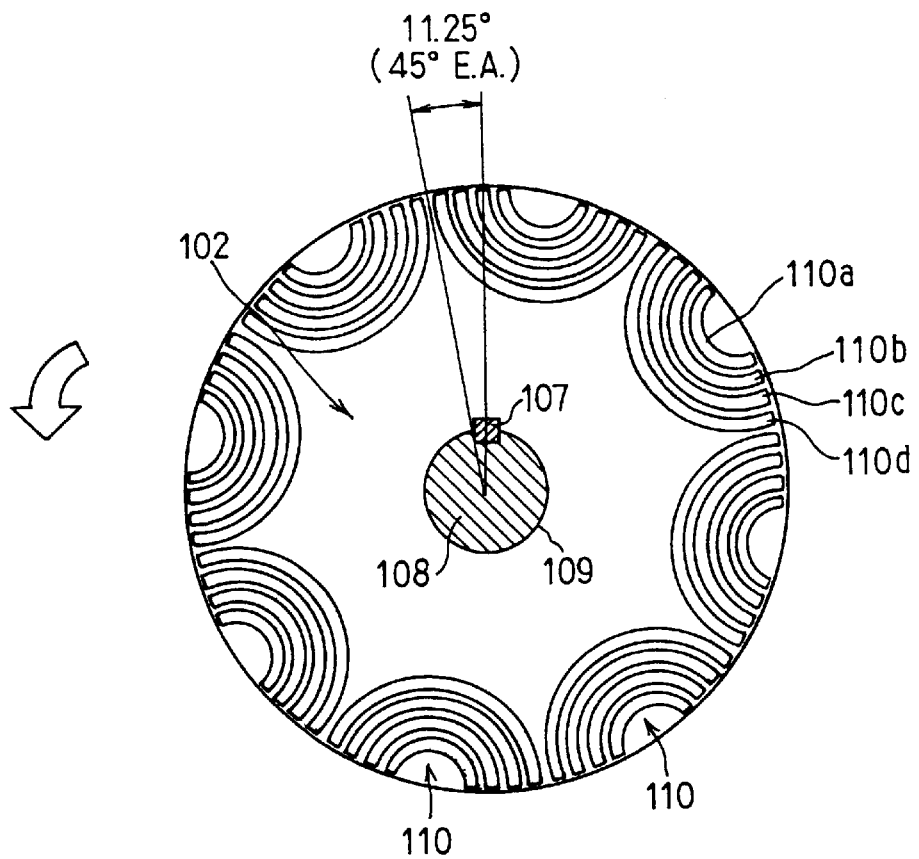
FIG. 3 is a schematic cross-sectional plan view of a second rotor portion of the rotary electric machine according to the first embodiment.

As shown in FIG. 2, alternately polarized eight permanent magnets 103a and 103b are respectively inserted into eight holes 111 formed at the outer periphery of first core 101 at equal intervals. However, permanent magnets 103 can be exposed outside. Each permanent magnet 103 is magnetized in the thickness direction thereof (the radial direction of the rotor) so as to alternately provide N-pole and S-pole in the circumferential direction.

First core 101 has center hole 112, to which shaft 108 and key 107 are fitted. The circumferential center of the keyhole of key 107 is positioned at the same angular position as the circumferential center of magnet hole 111.

Second core 102 has eight slit groups 110 formed in the circumferential direction thereof at equal interval. There are eight boundary center portions in second core 102, which respectively form magnetic salient poles.

Each slit group 110 has four arc-shaped slits 110a, 110b, 110c, and 110d. Second core 102 has center hole 109, to which the above-described shaft 108 and key 107 are also fitted. The keyhole of key 107 is positioned so that the boundary center portion between two adjacent slit groups 110 is shifted counterclockwise (in the rotating direction) from the circumferential center of the keyhole of key 107 by 11.250° (that corresponds to 45° in electric angle). That is, the salient induction pole of second core 102 is disposed in advance of the permanent magnet pole of first core 101 by 45° in electric angle. This angle can be changed to any angle between 0° and 90°. A higher torque can be provided at a higher speed if such angle is selected between 45° and 90°.

Armature winding 202 is a three-phase winding, which has in-slot portions inserted in a predetermined number of slots of stator core 201. The predetermined number of slots is formed at the inner periphery of stator core 201 at equal intervals.

In first core 101, there is a plurality of magnetic circuits. For example, a magnetic flux comes out from N-poled permanent magnet 103a, passes through stator 200 and goes back to S-poled permanent magnet 103b in one of the magnetic circuit. When three-phase alternating current is supplied to armature winding 202, a rotating magnetic field is formed.

Figure 4:
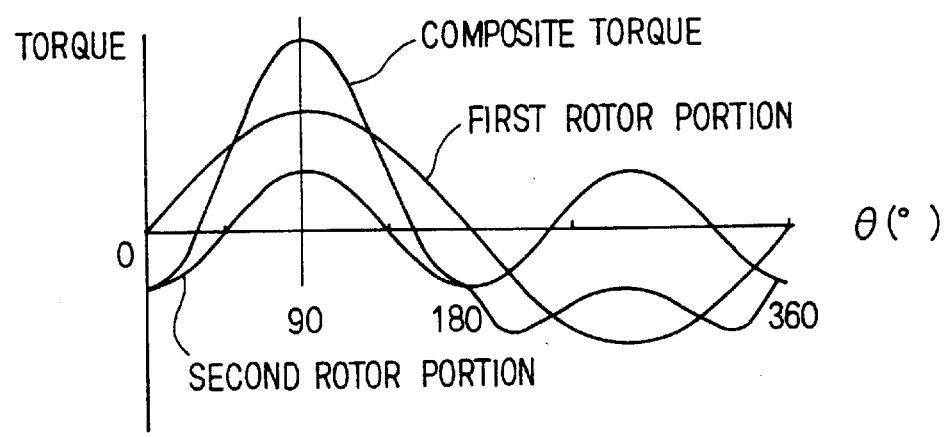
FIG. 4 is a graph showing characteristic curves of torque relative to phase-angles of the rotary electric machine according to the first embodiment.

Generally, a magnet torque generated by permanent magnets 103a, 103b and the rotating magnetic field of the armature winding is proportional to sin θ, if θ represents the phase angle or the difference in phase between the direction of the magnetic flux of the permanent magnet and the direction of the rotating magnetic field. Therefore, a maximum torque is generated by first core 101 when the phase angle is 90°, as shown in FIG. 4. In FIG. 4, the phase angle is zero when the circumferential center of N-pole magnet 103a and the direction of the rotating magnetic field agree with each other. If the rotating magnetic field rotates in the rotating direction of the rotor, the phase angle increases.

A reluctance torque is generated by second core 102 and the rotating magnetic field. A maximum reluctance torque is generated by second core 102 when the direction of the rotating magnetic field agree, or makes a right angle, with the middle portion between the circumferential center of the magnetic salient pole and the circumferential center of the slit group. As shown in FIG. 4, the maximum torque generated by first core 101 and the maximum torque generated by second core 102 are properly combined.

A rotary electric machine according to a second embodiment of the invention is described with reference to FIGS. 5–8.

Figure 5:
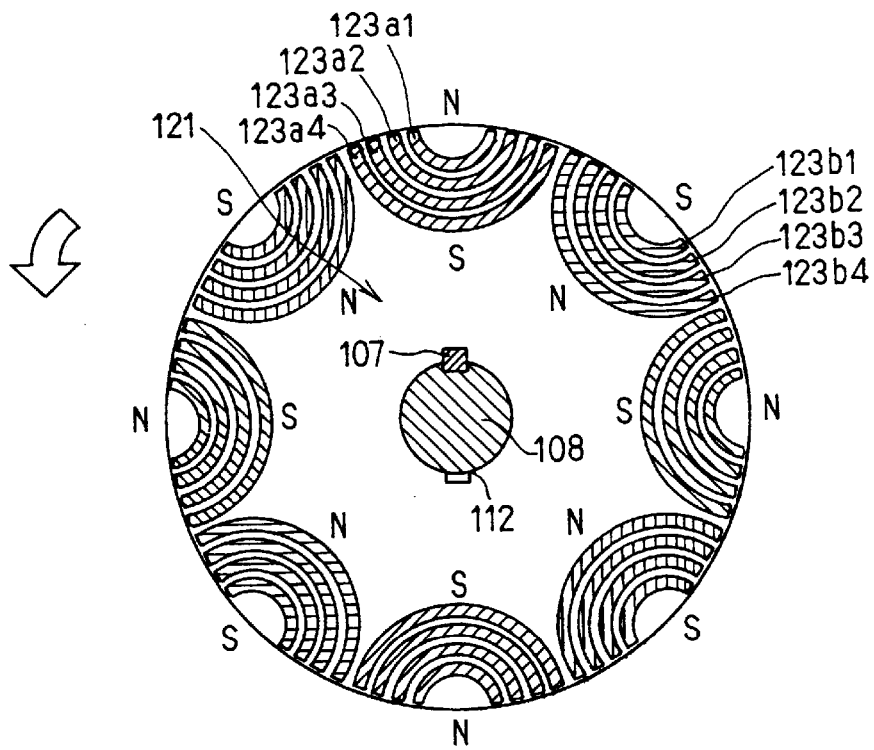
FIG. 5 is a schematic cross-sectional plan view of a first rotor portion of the rotary electric machine according to a second embodiment of the invention.
Figure 6:
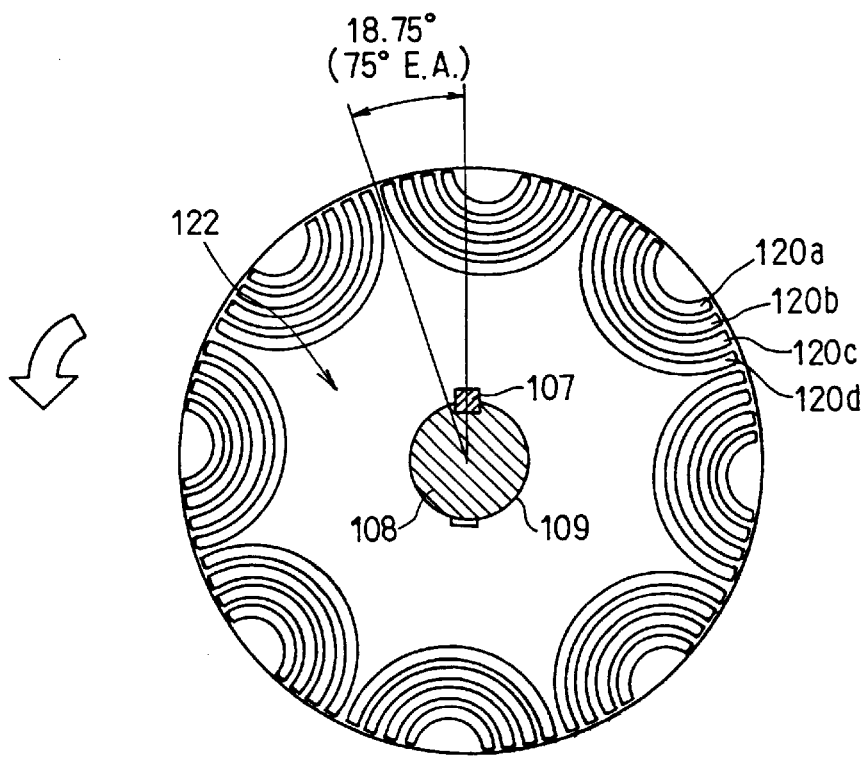
FIG. 6 is a schematic cross-sectional plan view of a second rotor portion of the rotary electric machine according to the second embodiment.

Rotor 1 of the rotary electric machine according to the second embodiment is comprised of a pair of first cores 121 on the opposite ends of rotor 1 and second core 122 between the pair of first cores 121. That is, the pair of first cores 101 of the first embodiment is substituted by the pair of first core 121, and second core 102 is substituted by second core 122. Second core 122 is the same in shape as second core 102 of the first embodiment. First core 121 has the same shape as second core 102 except for permanent magnets 123a–123d inserted in respective four slits of each slit group, as shown in FIG. 5. Each of permanent magnets 123a–123d is polarized in the thickness direction (radial direction of the rotor) to provide N or S pole alternately in the circumferential direction.

Second core 122 is fixed to first core 122 so that the circumferential center of the salient pole portion of second core 122 advances 18.75° in mechanical angle or 75° in electric angle from the magnetic flux of the permanent magnet pole.

Figure 7:
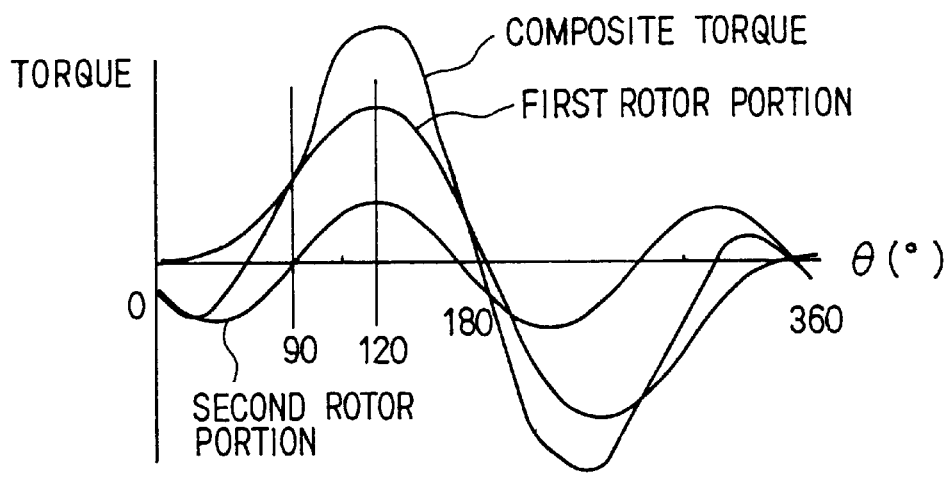
FIG. 7 is a graph showing characteristic curves of torque relative to phase-angles of the rotary electric machine according to the second embodiment.

As shown in FIG. 7, the torque generated by first core 121 and the torque generated by second core 122 are combined properly to provide maximum torque.

Figure 8:
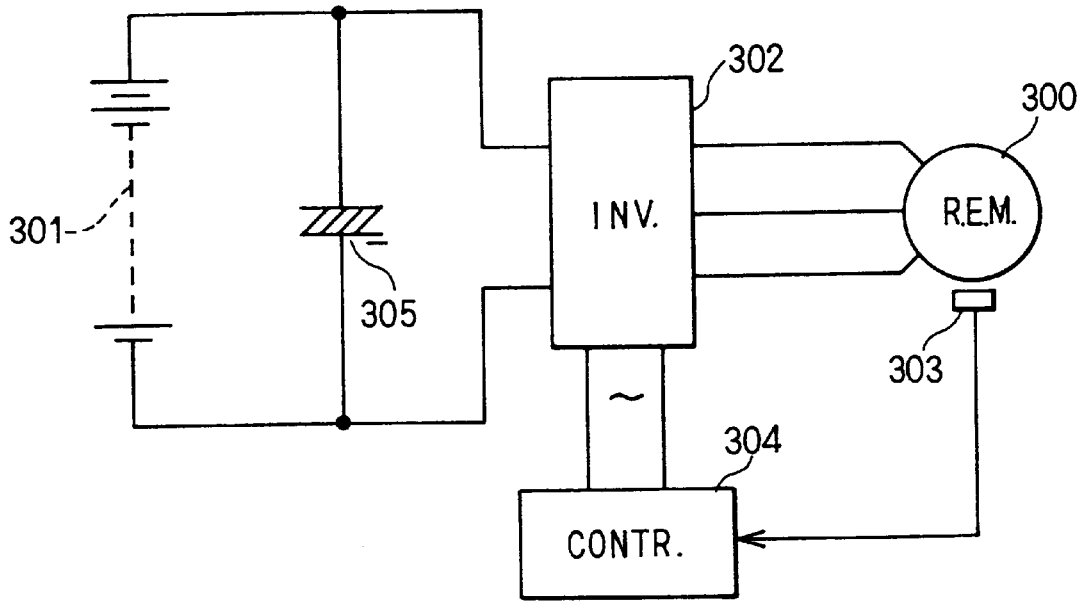
FIG. 8 is a circuit diagram of a control system for controlling the rotary electric machine according to the first and second embodiment mounted in a vehicle.

The rotary electric machine according to the first or second embodiment of the invention is mounted in a hybrid vehicle to drive the same, as shown in FIG. 8. A vehicle driving system shown in FIG. 8 includes rotary electric machine 300, battery 301, inverter 302, angular position sensor 303, controller 304, and smoothing capacitor 305. Inverter 302 controls transfer of an electric power between rotary electric machine 300 and battery 301. Sensor 303 detects the rotor angular position. Controller 304 controls inverter 302 according to the angular position of the rotor and a torque command signal sent from outside. Smoothing capacitor 305 is connected in parallel with battery 301.

Even if controller 304 fails and inverter 302 can not control the transfer of an electric power properly with the battery being fully charged, the output voltage of rotary electric machine 300 is sufficiently mall because of small volume of the permanent magnets. As a result, means for protecting inverter 302 and smoothing capacity 305 from a very high voltage is not necessary.

A rotary electric machine according to a third embodiment of the invention is described with reference to FIGS. 9–14.

In the meantime, the same reference numeral as that used in the previous embodiments in the figures presented below represents the same or substantially the same part or component as described above.

The rotary electric machine according to the third embodiment is comprised of rotor 1, stator 2, motor housing 3, gear housing 601, and input-output shaft (or planetary carrier) 501.

Stator 2 is comprised of first stator core 2011, second stator core 2012, non-magnetic plate 2013 disposed between first stator core 2011 and second stator core 2012, and armature winding 202, which are held in motor housing 3.

Rotor 1 is disposed inside stator 2 and supported by motor housing 3 via bearings 401 and 402. Rotor 1 is comprised of first rotor portion 10 and second rotor portion 20.

Figure 10:
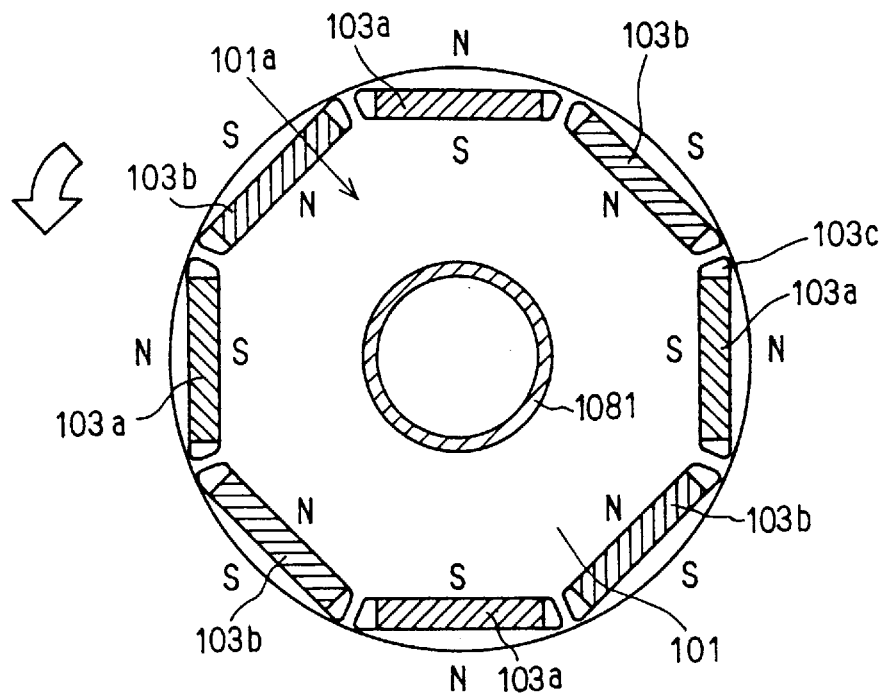
FIG. 10 is a schematic cross sectional front view of a first rotor portion shown in FIG. 9 cut along line 10—10.

As shown in FIG. 10, first rotor portion 10 is comprised of hollow shaft 1081 and first rotor core 101 made of laminated iron sheets, and eight permanent magnets 103*a* and 103*b*, which are respectively inserted into eight axially extending magnet holes 103*c* of first rotor core 101. Eight magnet holes 103*c* are formed at the peripheral portion of first rotor core 101, and N-poled permanent magnets 103*a* and S-poled permanent magnets 103*b* are alternately inserted into magnet holes 103*c*.

Figure 11:
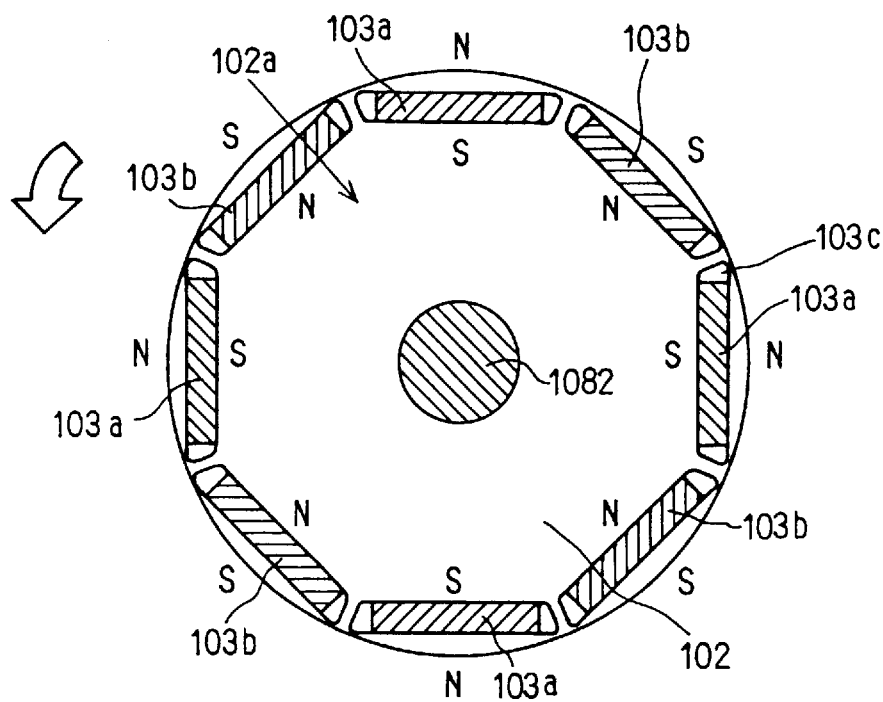
FIG. 11 is a schematic cross sectional front view of a second rotor portion shown in FIG. 9 cut along line 11—11.

As shown in FIG. 11, second rotor portion 20 is comprised of shaft 1082 and second rotor core 102 made of laminated iron sheets, and eight permanent magnets 103*a* and 103*b*, which are respectively inserted into eight axially extending magnet holes 103*c* of second rotor core 102. Eight magnet holes 103*c* are formed at the peripheral portion of second rotor core 102, and N-poled permanent magnets 103*a* and S-poled permanent magnets 103*b* are alternately inserted into magnet holes 103*c*.

The rear portion (right in FIG. 9) of shaft 1082 is supported by motor housing 3 via bearing 404. The front portion of shaft 1082 is supported by hollow shaft 1081 via bearings 403 so as to extend through the hollow portion of hollow shaft 1081 into the inside of gear housing 601.

The front portion of shaft 1081 is supported by motor housing via bearing 401, so that both shafts 1081 and 1082 are disposed to be coaxial with each other. Gear housing 601 accommodates a planetary gear unit.

A pair of sun gears 502 and 503 is respectively fixed to the front ends of shafts 1081 and 1082. Sun gear 502 links ring gear 506 via planetary gear 504, and sun gear 503 links with ring gear 507 via planetary gear 505. Planetary gear 504 and 505 are respectively supported, via bearings 509 and 510, by common support-shaft 508. Shaft 508 is fixed to output-input shaft 501 at its rear flange portion. Output-input shaft 501 is rotatably supported by gear housing 601 via bearing 405.

Ring gear 506 is fixed to the inner periphery of gear housing 601, and ring gear 507 is rotatably supported by the inner periphery of gear housing 601 via bearing 511. The front side of ring gear 507 has a gear portion 512 in mesh with worm gear 701 formed at an output shaft of rotary actuator 700 disposed in gear housing 601. Gear housing 601 contains lubrication oil therein, and oil-seal members 901 and 902 are respectively fitted to spaces between gear housing 601 and output shaft (planetary carrier) 501 and between gear housing 601 and shaft 1081.

Rotation sensors 801 and 802 are respectively fixed to front and rear portions of motor housing 3 to detect angular position of first and second rotor portions 10 and 20.

The torque of first rotor portion 10 and the torque of second rotor portion 20 are transmitted, via sun gears 502, 503, planetary gears 504 and 505, to output-input shaft 501, which combines the torque of the first and second rotor portions 10 and 20. When worm gear 701 is rotated to rotate ring gear 507, sun gear 503 rotates first rotor portion 10 relative to second rotor portion 20. Therefore, the torque of first rotor portion 10 is changed so that the composite torque can be changed.

Figure 12:
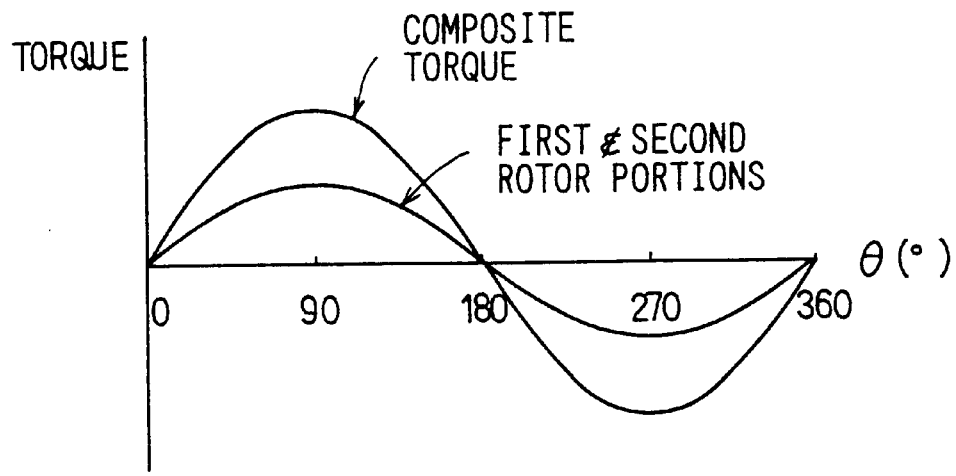
FIG. 12 is a graph showing characteristic curves of torque relative to phase-angles of the rotary electric machine according to the third embodiment.

As shown in FIG. 12, when the magnetic poles of first rotor portion 10 and the magnetic poles of second rotor portion 20 are disposed at the same angular positions with the phase difference between two being zero, the torque generated by both first and second rotor portions is the same and a maximum composite torque can be obtained at the phase angle of 90°. The composite torque is provided at the output-input shaft 501 that is transmitted from first rotor portion 10 and second rotor portion 20 via the planetary gear unit.

Figure 13:
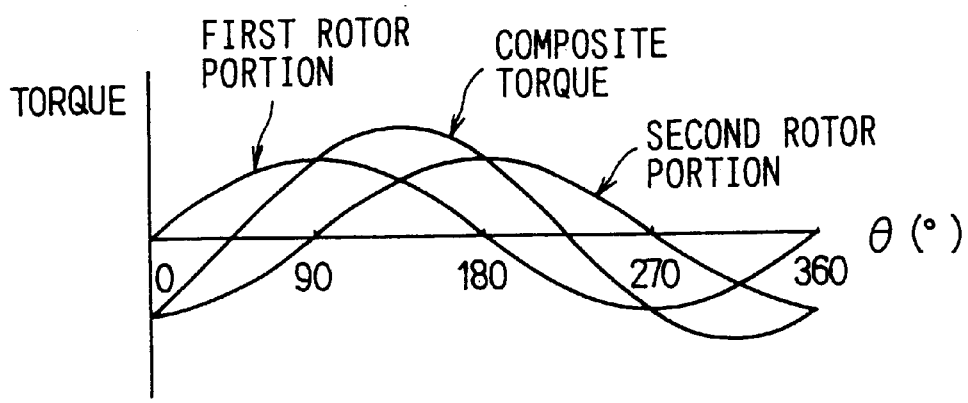
FIG. 13 is a graph showing characteristic curves of torque relative to phase-angles of the rotary electric machine according to the third embodiment.

First rotor portion 10 can be rotated relative to second rotor portion 20 by ring gear 507 in the direction opposite the rotating direction, for example in a range between 0°–180° in electric angle or 0°–45° in mechanical angle. As shown in FIG. 13, when the magnetic poles of first rotor portion 10 and the magnetic poles of second rotor portion 20 are shifted by 90° in electric angle from each other, the torque generated by both first and second rotor portions is different in phase, and a reduced composite torque can be obtained. In this case, a reduced maximum composite torque can be obtained at the phase angle θ being 135°. This also reduces the output voltage when the rotary electric machine is used as a generator.

Figure 14:
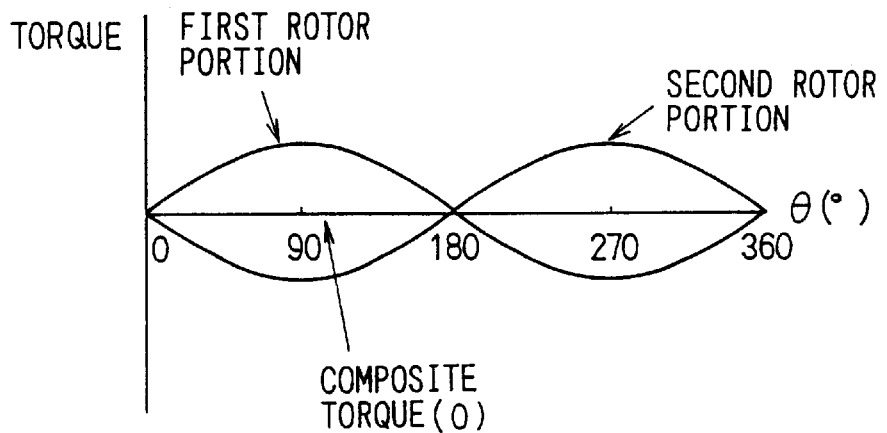
FIG. 14 is a graph showing characteristic curves of torque relative to phase-angles of the rotary electric machine according to the third embodiment.

As shown in FIG. 14, the composite torque becomes zero if the phase difference between first and second rotor portions 10 and 20 is 180° in electric angle. This also reduces the output voltage to zero.

Thus, a ring gear of one of two planetary-gear-type speed reduction mechanisms is changed to control composite magnetic flux that is interlinked with the armature winding.

One of rotation sensors 801 and 802 can be omitted if the angular position of rotary actuator 700 or ring gear 507 can be detected.

As long as the rotary electric machine normally operates as a motor or a generator, the phase difference between the two rotor portions should be controlled at a position where a maximum value of positive or negative composite torque equals to a required torque. It would be possible to control the phase difference between first and second rotor portions to a suitable phase difference while the rotary electric machine operates normally. If the phase angle of the second rotor portion, which is not controllable, is set 90° to generate maximum electric power or set 270° to generate maximum torque, it is easy to provide a suitable electric power or torque by mechanically controlling the phase angle of the first rotor portion.

Figure 15:
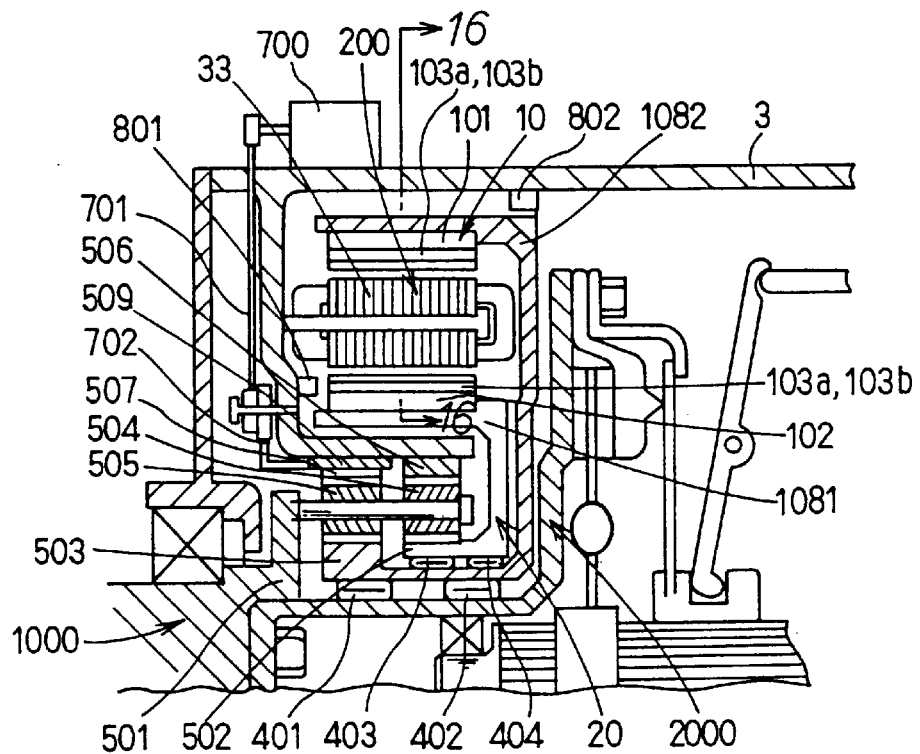
FIG. 15 is a fragmentary schematic cross-sectional side view of a rotary electric machine according to a fourth embodiment of the invention.
Figure 16:
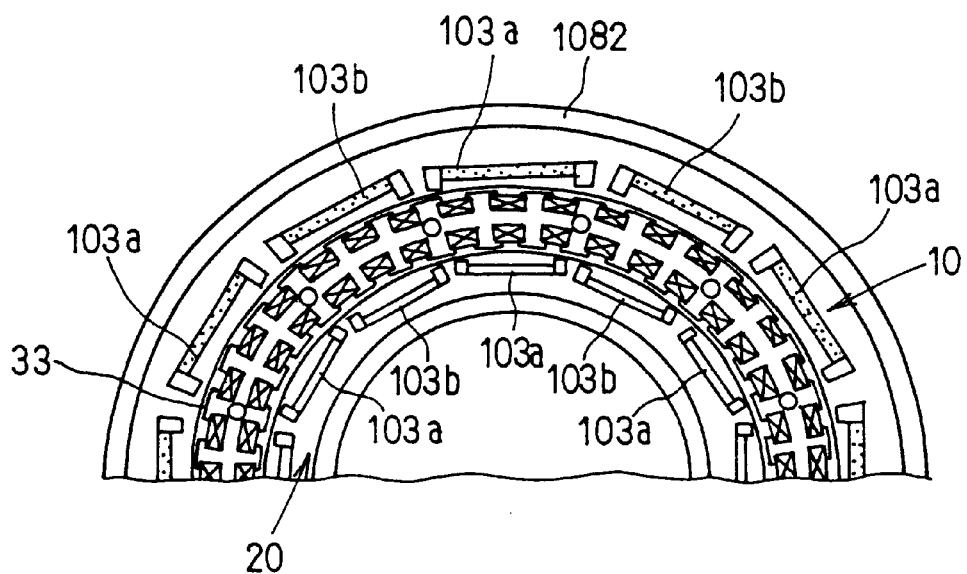
FIG. 16 is a fragmentary cross-sectional front view of the portion shown in FIG. 15 cut along line 16—16.

A rotary electric machine according to a fourth embodiment of the invention is described with reference to FIGS. 15 and 16.

Stator 200 is comprised of laminated stator core 201 and stator winding 202, and is fixed to motor housing 3 by a plurality of supporting rods 33. Outer rotor portion 10 is disposed around the outer surface of stator 200 to face the same via an air gap, and inner rotor portion 20 is disposed inside the inner surface of stator 200 to face the same via an air gap.

Outer rotor portion 10 is comprised of outer rotor core 101 formed of laminated iron sheets, hollow or cup-shaped shaft 1082, and permanent magnets 103*a* and 103*b* respectively inserted in magnet holes 103*c*. Permanent magnets 103*a* and 103*b* are also magnetized in the thickness direction thereof to provide different polarities, so that circumferentially alternating magnetic fields can be provided.

Inner rotor portion 20 is comprised of inner rotor core 102 formed of laminated iron sheets, hollow shaft 1081, and permanent magnets 103*a* and 103*b* respectively inserted in magnet holes 103*c*. Permanent magnets 103*a* and 103*b* are respectively magnetized in the thickness direction thereof to provide different polarities, so that circumferentially alternating magnetic fields can be provided.

Hollow or cup-shaped shaft 1081 is rotatably supported by shaft 1082 via bearings 403 and 404, and hollow shaft 1082 is rotatably supported by clutch plate 2000 via bearings 401 and 402.

Hollow shaft 1081 has a cylindrical inner space, in which sun gears 502 and 503 are disposed closely to each other.

Sun gear 502 is connected to ring gear 506 via planetary gear 504, and sun gear 503 is connected to rig gear 507 via planetary gear 505. Planetary gears 54 and 55 are rotatably supported by common shaft 508, which is fixed to planetary carrier 501, which is an input-output shaft. Planetary carrier 501 is fixed to engine crankshaft 1000 and clutch plate 2000.

Ring gear 506 is fixed to housing 3, and ring gear 507 is rotatably supported by housing 3 via bearing 509. Ring gear 507 has gear 702 that is in mesh with a gear of output linkage 701 of actuator 700.

Rotation sensors 801 and 802 respectively detect the positions of inner rotor portion 20 and outer rotor portion 10.

The operation of this rotary electric machine is substantially the same as the rotary machine according to the third embodiment of the invention, except that the composite torque becomes zero as shown in FIG. 14 when the phase difference is 0° instead of 180°.

Figure 17:
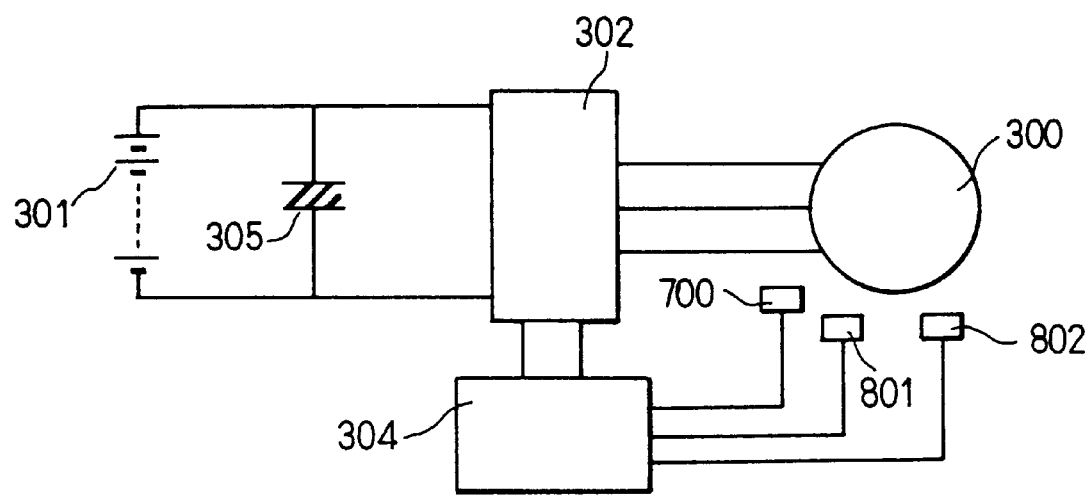
FIG. 17 is a circuit diagram of a vehicle driving system for controlling the rotary electric machine according to the fourth embodiment.

The rotary electric machine according to the fourth embodiment of the invention is mounted in vehicle driving system of a hybrid vehicle as shown in FIG. 17. The vehicle driving system includes synchronous motor 300, battery 301, inverter 302, angular position sensors 801 and 802, rotary actuator 700, controller 304, and smoothing capacitor 305. Inverter 302 controls transfer of an electric power between rotary electric machine 300 and battery 301. Angular position sensors 801 and 802 detect the angular positions of the first and second rotor portions. Controller 304 controls inverter 302 according to the angular positions of the first and second rotor portions and a torque command signal sent from outside. Smoothing capacitor 305 is connected in parallel with battery 301.

If controller 304 fails and inverter 302 can not control the transfer of an electric power properly with the battery being fully charged, the phase difference between the first and second rotor portions are controlled as described above so that the output voltage of rotary electric machine 300 can be controlled at a suitable level. As a result, inverter 302 and smoothing capacity 305 can be protected effectively.

As a variation of the above embodiment, one of the first and second permanent-magnet-type rotor portions can be substituted by a salient-induction-pole-type rotor that is described above.

Figure 18:
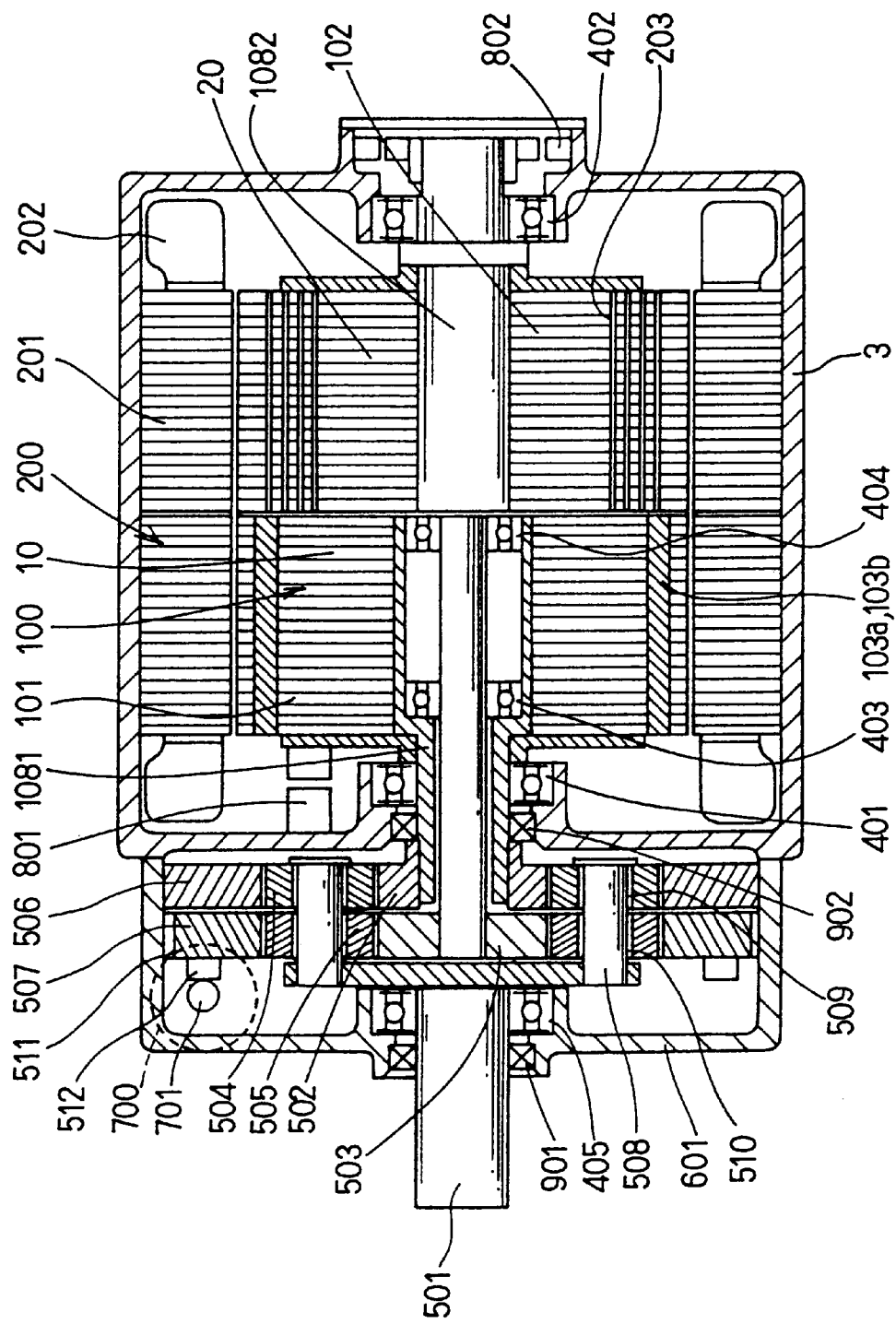
FIG. 18 is schematic longitudinal cross-sectional view of a rotary electric machine according to a fifth embodiment of the invention.

A rotary electric machine according to a fifth embodiment of the invention is described with reference to FIGS. 18–20.

Rotor 100 is comprised of permanent-magnet-type first rotor portion 10 and salient induction pole-type second rotor portion 20. Second rotor portion 20 is substantially the same in structure as the first embodiment shown in FIG. 3. Preferably, the outside diameter of the second rotor portion 20 is larger than first rotor portion 10. In other words, the air gap between stator 200 and second rotor portion is smaller than the air gap between stator 200 and first rotor portion 10. Other parts and components are substantially the same as the rotary electric machine shown in FIG. 9.

Figure 19:
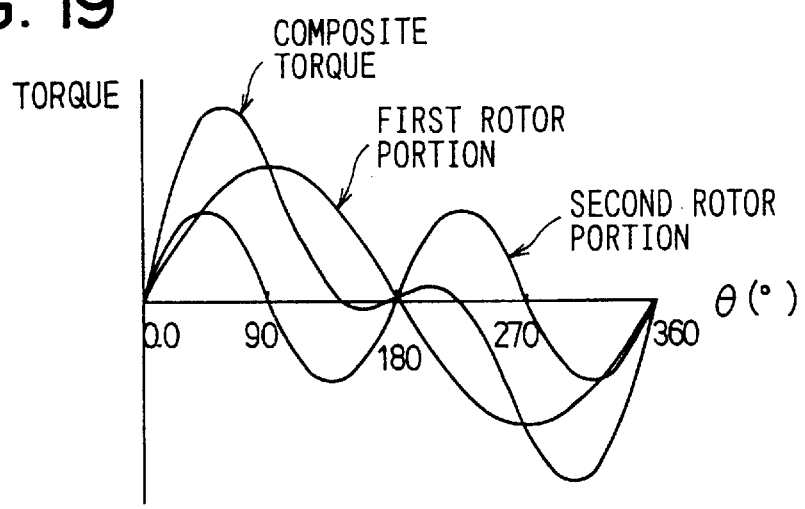
FIG. 19 is a graph showing characteristic curves of torque relative to phase-angles of the rotary electric machine according to the fifth embodiment.
Figure 20:
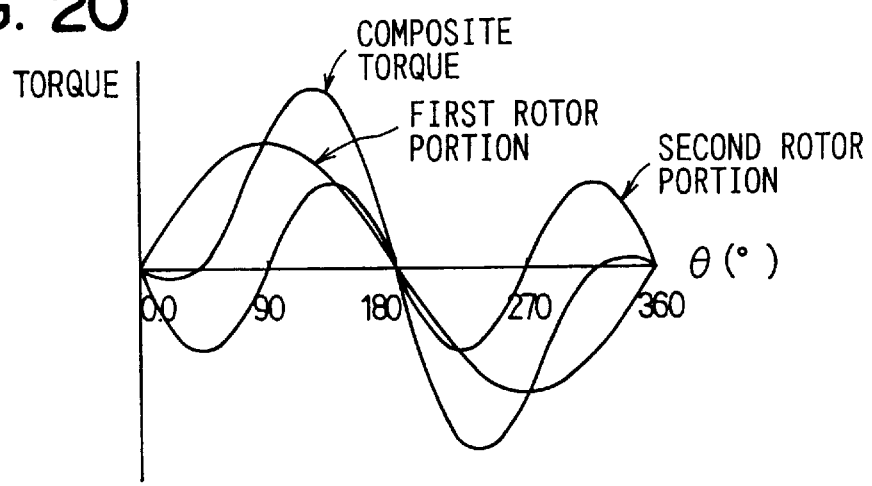
FIG. 20 is a graph showing characteristic curves of torque relative to phase-angles of the rotary electric machine according to the fifth embodiment.

If ring gear 507 is not rotated, a composite torque can be obtained as shown in FIG. 19.

If this rotary electric machine is operated as a motor at a low speed, ring gear 507 is rotated in the direction opposite the rotor's rotating direction to advance second rotor portion 20 to first rotor portion 10 by 11.25° (45° in electric angle). Then, a maximum torque can be obtained at phase angle 90°, as shown in FIG. 4.

If this rotary electric machine is operated as a motor at a high speed, it is necessary to rotate the ring gear so that the rotary electric machine can operate at a phase angle between 90° and 180°, in order to reduce the permanent-magnet flux. A large composite torque can be provided if the peak of the torque generated by second rotor portion 20 comes at a phase angle between 90° and 180°, as shown in FIG. 20.

Figure 21:
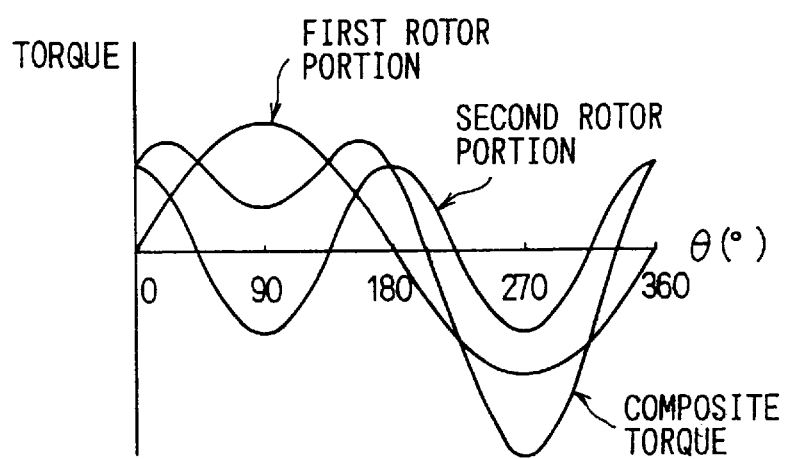
FIG. 21 is a graph showing characteristic curves of torque relative to phase-angles of the rotary electric machine according to the fifth embodiment.

If this rotary machine is operated as a generator at a low speed, ring gear 507 is rotated in the same direction as the rotor's rotating direction to retard second rotor portion 20 from first rotor portion 10 by 11.25° (45° in electric angle). Consequently, the composite torque becomes maximum at the phase angle of 270°, as shown in FIG. 21.

Figure 22:
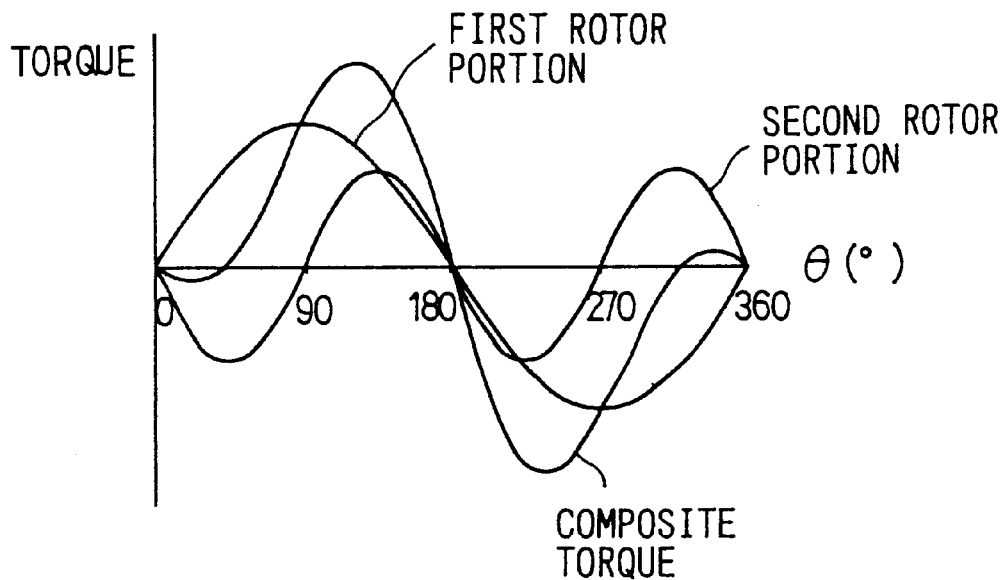
FIG. 22 is a graph showing characteristic curves of torque relative to phase-angles of the rotary electric machine according to the fifth embodiment.

If this rotary electric machine is operated as a generator at a high speed, it is generally operated at a phase angle between 180° and 270°, as shown in FIG. 22. If the torque peak of second rotor portion 20 comes at a phase angle between 180° and 270°, a maximum composite torque can be provided.

Figure 23:
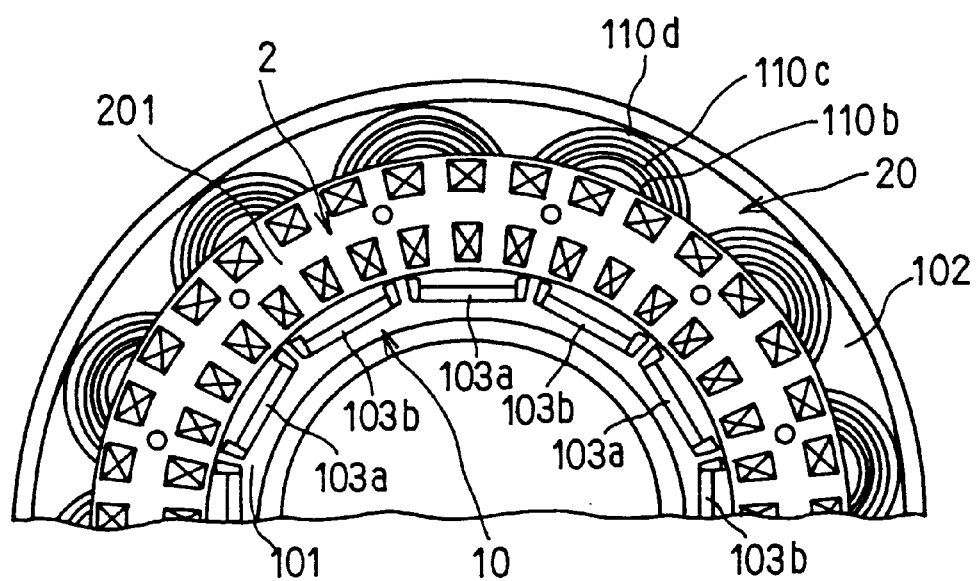
FIG. 23 is a fragmentary cross-sectional front view of a rotary electric machine according to a sixth embodiment of the invention.
Figure 24:
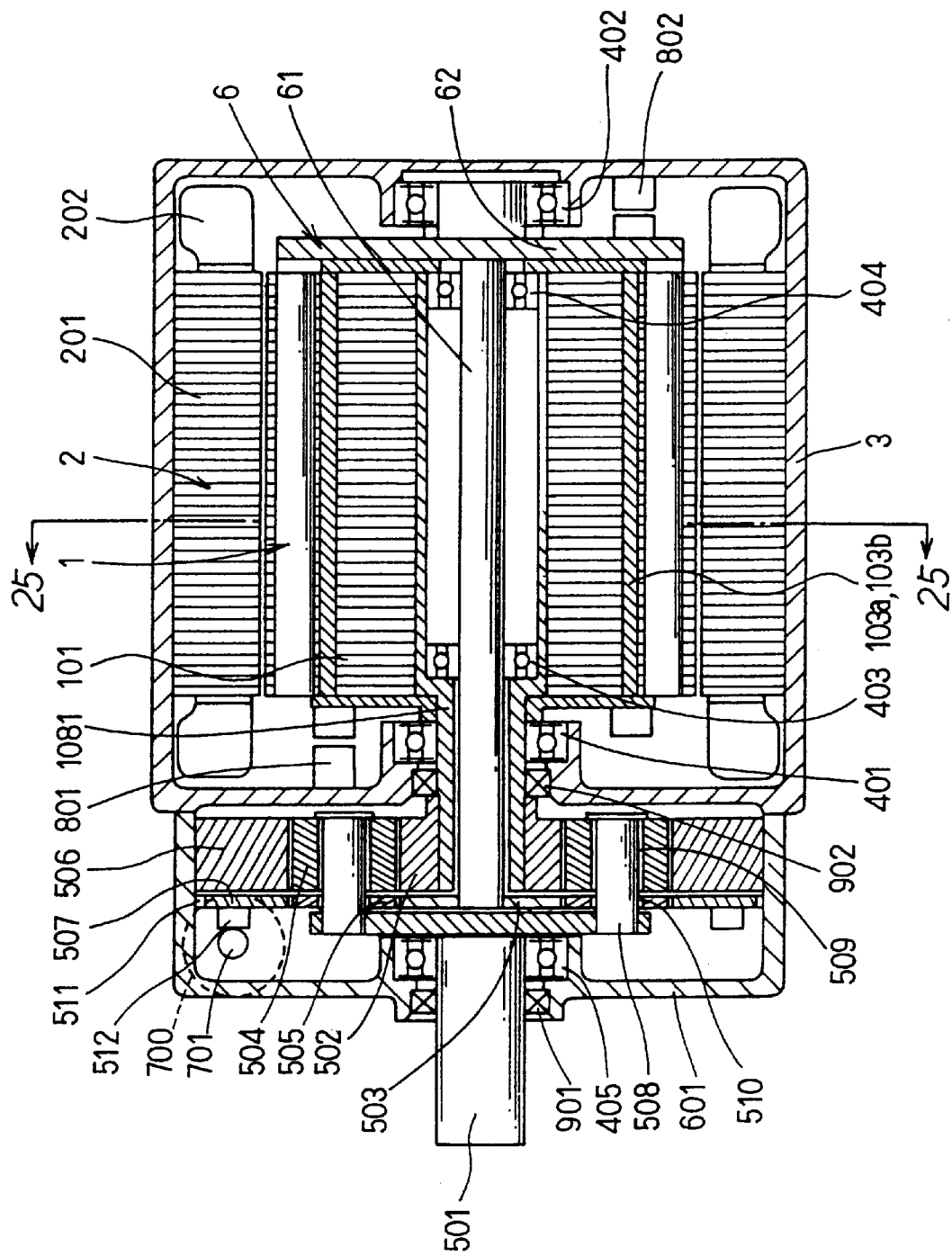
FIG. 24 is a schematic longitudinal cross-sectional view of a rotary electric machine according to a seventh embodiment.
Figure 25:
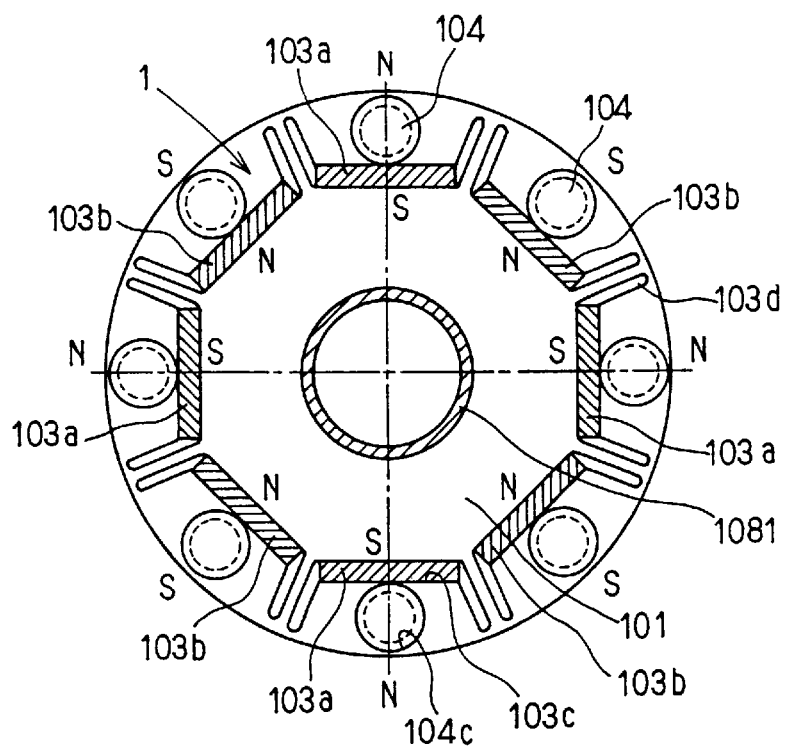
FIG. 25 is a schematic cross-sectional plan view of a rotor portion of the rotary electric machine according to the seventh embodiment.

A rotary electric machine according to a sixth embodiment of the invention is described with reference to FIG. 23.

Permanent-magnet-type second rotor portion 20 can be substituted by a salient induction pole-type rotor portion as described above. Generally, the salient-induction-pole-type rotor portion is suitable to such second rotor portion disposed radially outer side of the first rotor portion, because the former is stronger against a centrifugal force than the permanent-magnet-type rotor portion.

Salient-induction-pole-type rotor portion 20 is comprised of stator core 201 made of laminated iron sheets and hollow shaft 1082. Second rotor core 201 has a plurality of groups of arc-shaped slits 110b, 110c and 110d with the convex portion being radially outside. The plurality of groups of slits 110b, 110c and 110d are formed in the circumferential direction of second rotor core 102 at equal intervals.

Because second rotor portion 20 does not have a plurality of permanent magnets, the output voltage will not exceed a maximum withstand voltage of control circuits even if the rotation speed of the rotary electric machine becomes maximum.

A rotary electric machine according to a seventh embodiment is described with reference to FIGS. 24–32.

The rotary electric machine according to the seventh embodiment is comprised of permanent-magnet-type rotor 1, stator 2, motor housing 3, gear housing 4, output-input shaft 501, magnetic short-circuit member 6, gear housing 601 and a planetary gear mechanism accommodated in gear housing.

Permanent-magnet-type rotor 1 is comprised of hollow shaft 1081, rotor core 101 made of laminated iron sheets core, eight permanent magnets 103a, and 103b, and eight magnetic pins 14. Eight permanent magnets 103a and 103b are alternately polarized in opposite radial directions and buried in eight magnet holes 103c that are formed in rotor core 101 at equal angular intervals. Each magnet hole 103c has circumferentially extending main portion and a pair of radial-outwardly extending end portions. Eight magnetic pins 104, which are made of soft magnetic material, are fitted in eight pin-holes 104c formed in rotor core 101 at the radially outer side of magnet holes 103c at equal angular intervals. The right ends of magnetic pins 104 project right from the right end of rotor core 101. Each pin-hole 104c may be connected to one of magnet holes 103c.

Figure 26:
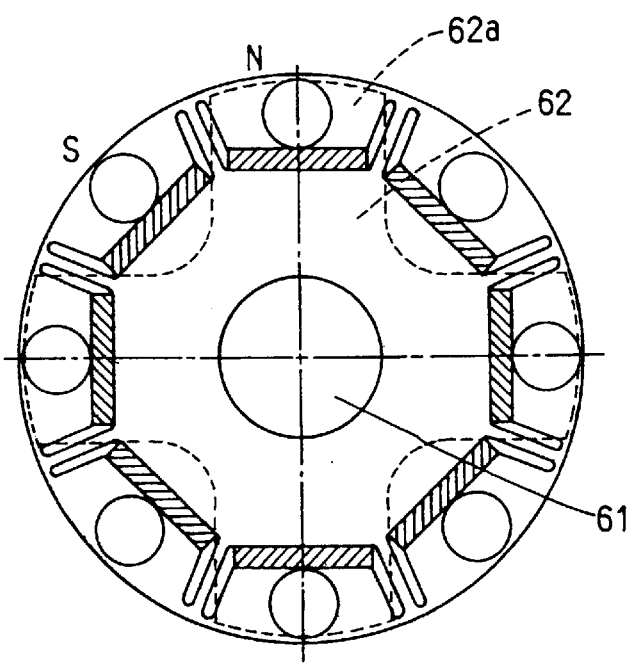
FIG. 26 is a schematic cross-sectional plan view of a rotor portion of the rotary electric machine according to the seventh embodiment.

Short-circuit member 6 is comprised of shaft 61 and short-circuit plate 62 fixed to shaft 61. Short-circuit plate 62 is a disk plate made of a soft magnetic material and is disposed near the right ends of magnetic pins 104. As shown in FIG. 26; short-circuit plate 62 has four salient portions 62a. Shaft 61 is inserted in rotor shaft 1081.

Figure 9:
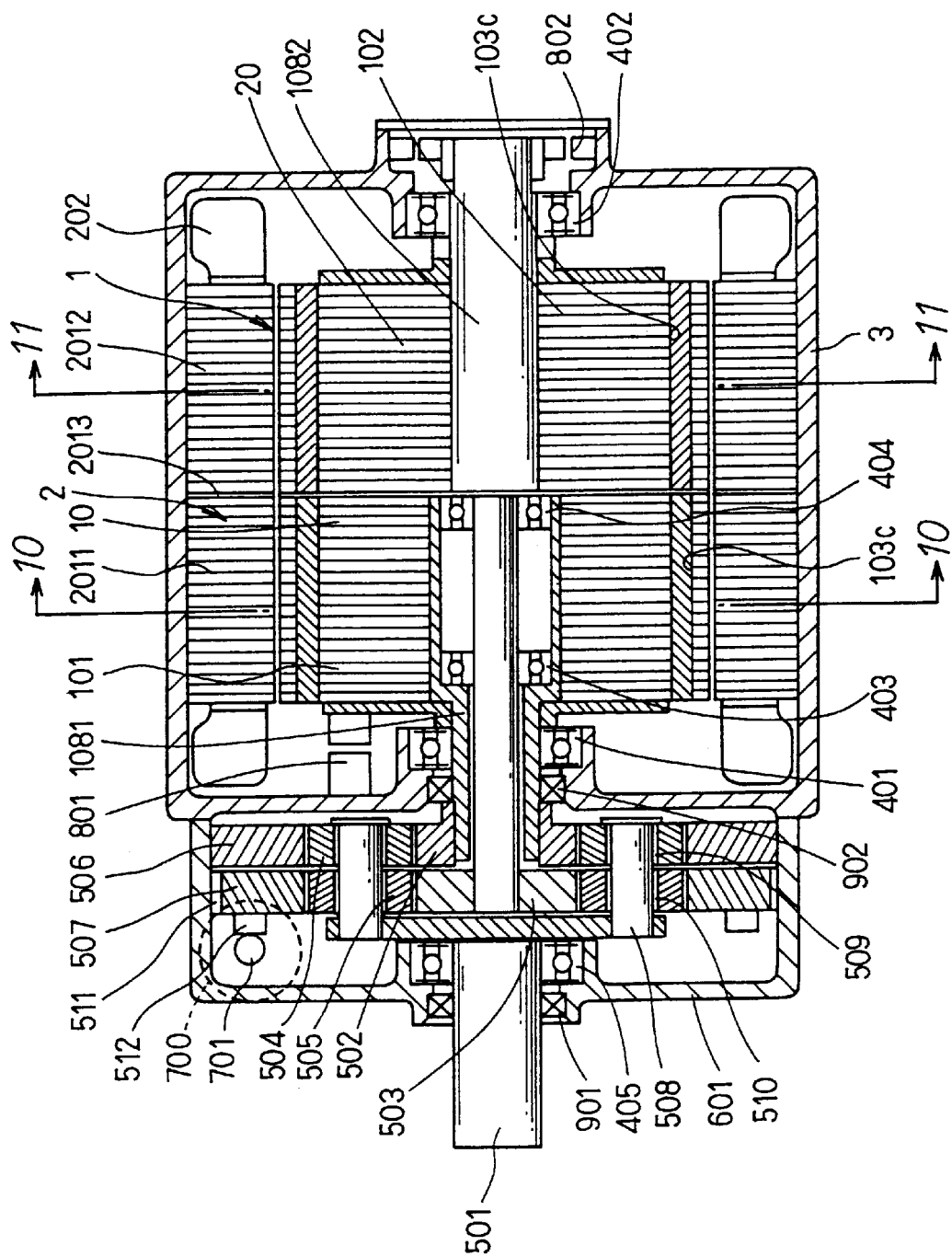
FIG. 9 is a schematic cross-sectional side view of a rotary electric machine according to a third embodiment of the invention.

Other portions are substantially the same as the rotary machine according to the third embodiment shown in FIG. 9.

If ring gear 507 is not rotated, short-circuit plate is disposed as shown in FIG. 26. Accordingly, a minimum short-circuit path is formed between neighboring poles so that a maximum effective magnetic flux is supplied to stator winding 202. On the other hand, if ring gear 507 is rotated, short-circuit plate is located at positions shown in FIG. 27. Accordingly, a maximum short-circuit path including the right end portions of magnetic pins 104 is formed between neighboring poles so that a minimum effective magnetic flux is supplied to stator winding 202.

For example, if this rotary electric machine is operated as a motor at a low speed, ring gear 507 is not rotated so that a maximum torque can be obtained. If this rotary electric machine is operated as a motor at a high speed, short-circuit plate 62 is rotated to the position shown in FIG. 27 to reduce the permanent-magnet flux. If this rotary machine is operated as a generator at a low speed, short-circuit plate is returned to the original position shown in FIG. 26. Consequently, the torque becomes maximum. If this rotary electric machine is operated as a generator at a high speed, short-circuit plate 62 is rotated to the position shown in FIG. 27 to prevent stator winding 202 from generating an abnormally high voltage.

Figure 31:
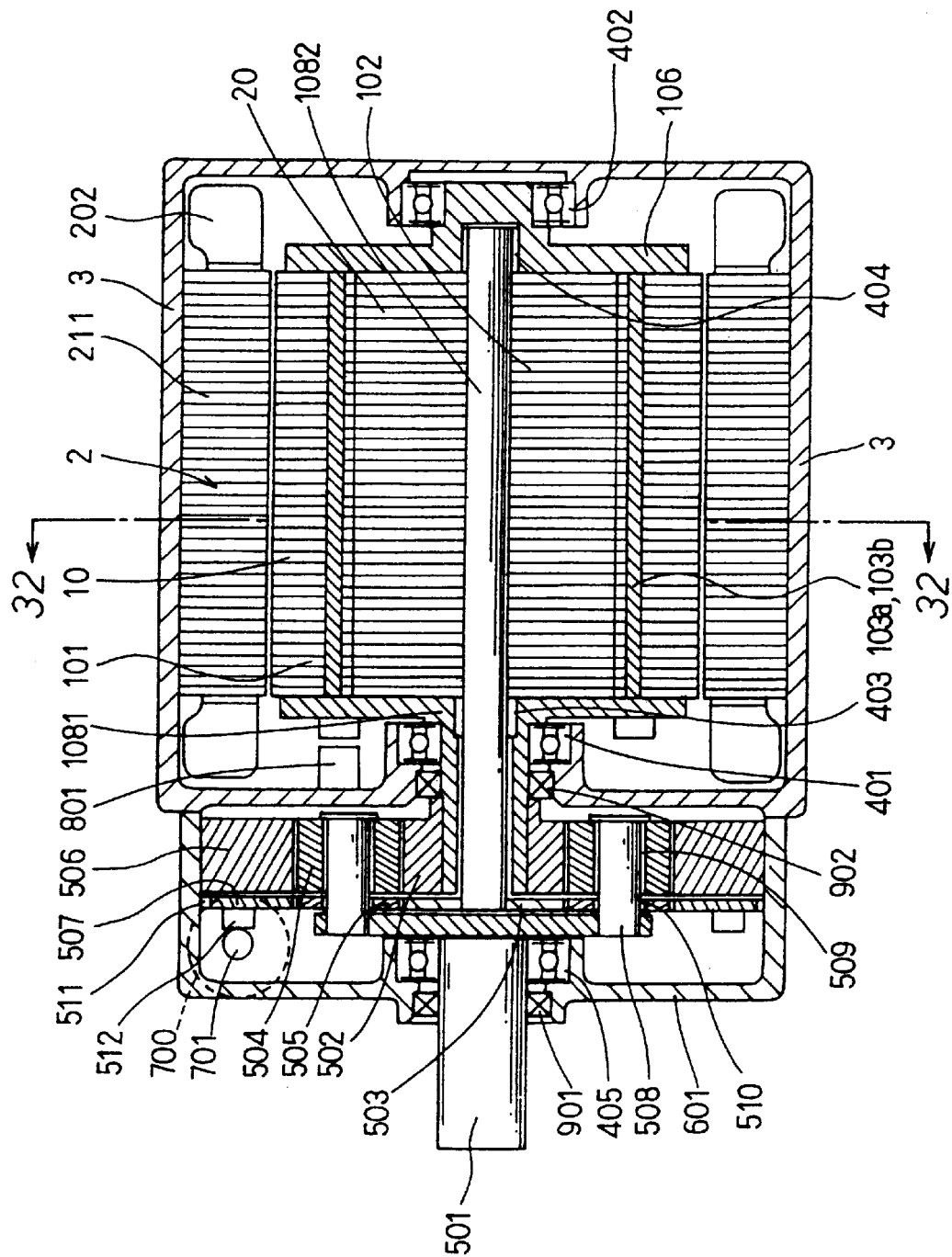
FIG. 31 is a schematic longitudinal cross-sectional view of a rotary electric machine according to an eighth embodiment of the invention.

The rotary electric machine according to the seventh embodiment is mounted in a vehicle driving control system of a hybrid vehicle, as shown in FIG. 17. If the rotary electric machine according to the seventh embodiment is used as a generator, it may be controlled as follows, as shown in FIG. 31.

After the driving control system starts, whether or not the rotary electric machine operates at a high speed and inverter 302 fails is examined.

If the result is YES, whether or not battery 301 is fully charged is examined at step S102. On the other hand, if the result of step S100 is NO, step S100 is repeated.

Figure 27:
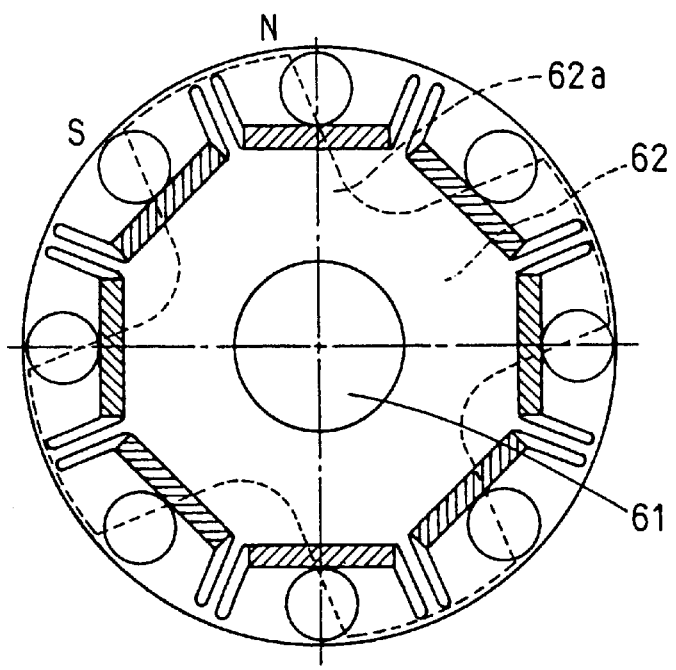
FIG. 27 is a schematic cross-sectional plan view of a rotor portion of the rotary electric machine according to the seventh embodiment.
Figure 28:
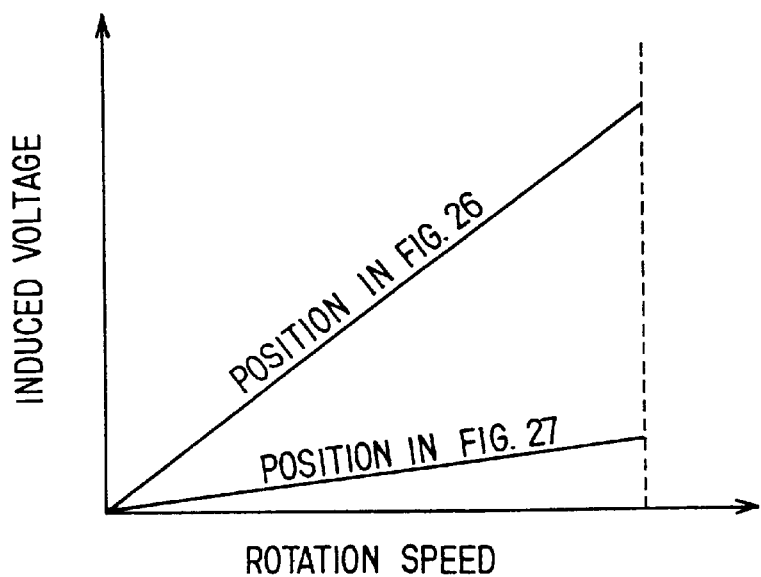
FIG. 28 is a graph showing induced voltages of the rotary electric machine according to the seventh embodiment.
Figure 29:
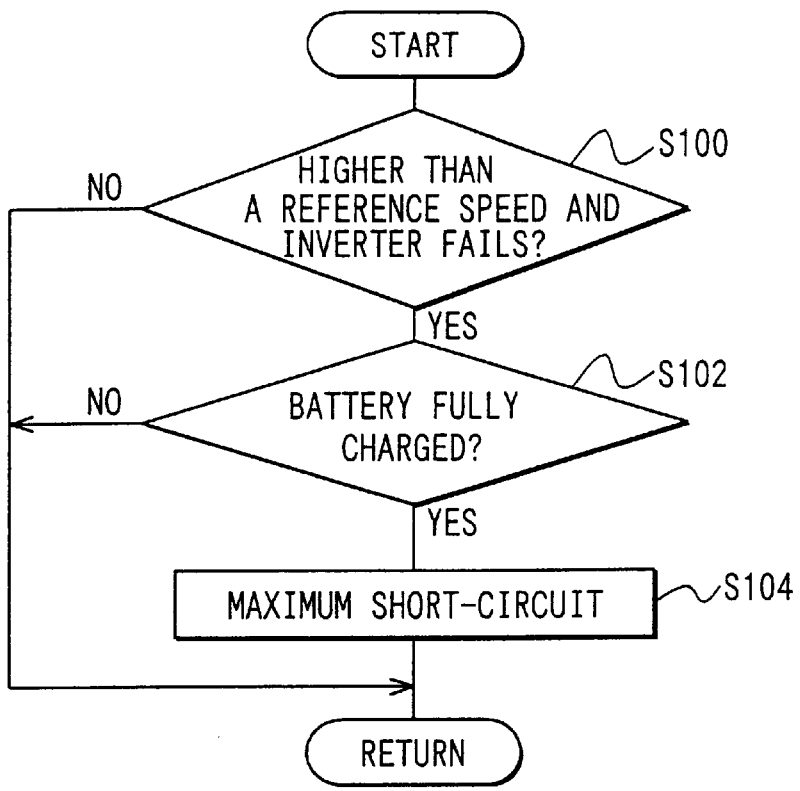
FIG. 29 is a flow diagram of a drive control system for controlling the rotary electric machine according to the seventh embodiment mounted in a vehicle.

If the result of step S102 is YES, rotary actuator 700 rotates short-circuit plate 62 to the maximum short-circuit position shown in FIG. 27 at step S104. Accordingly, effective magnetic flux decreases, so that the voltage induced in the stator winding can be controlled within an allowable level, as shown in FIG. 28. On the other hand, if the result of step S102 is NO, step S100 is also repeated.

Figure 30:
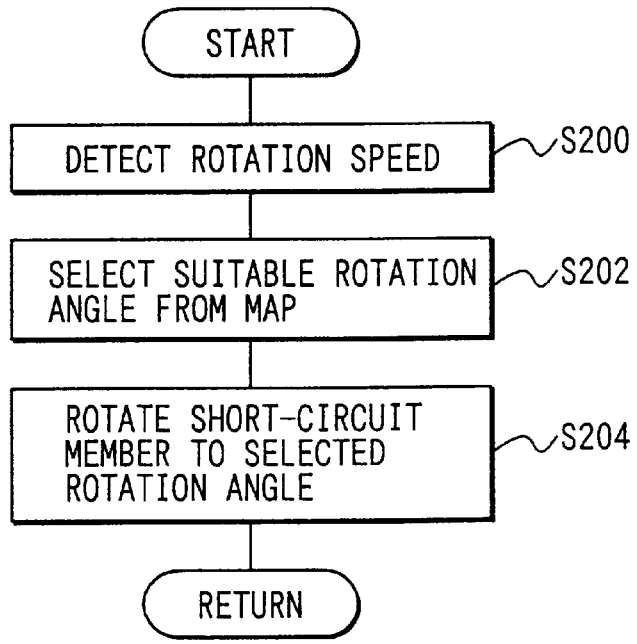
FIG. 30 is a flow diagram of a drive control system for controlling the rotary electric machine according to the seventh embodiment mounted in a vehicle.

Instead of examining the operation failure described above, it is possible to control short-circuit plate 62 according to the rotation speed, as shown in FIG. 30.

At step S200, the rotation speed is detected. Subsequently at step S202, rotation angle of short-circuit plate 62 that corresponds to the rotation speed is selected from a map. At step S204, rotary actuator 700 rotates short-circuit plate 62 to the selected rotation angle, so that the output voltage can be controlled within an allowable level.

A rotary electric machine according to an eighth embodiment is described with reference to FIGS. 31–33.

The rotary electric machine according to the eighth embodiment is comprised of rotor 1, stator 2, motor housing 3, gear housing 4, output-input shaft 501, gear housing 601 and a planetary gear mechanism accommodated in gear housing 4. Rotor 1 is comprised of hollow shaft 1081, outer rotor portion 10, inner rotor portion 20, eight permanent magnets 103*a*, and 103*b*, and flange member 106. Outer and inner rotor portions 100 and 200 are respectively made of cylindrical rotor cores 101 and 102 of laminated iron sheets.

Eight permanent magnets 103*a* and 103*b* are alternately polarized in opposite radial directions and buried in eight magnet holes 103*c* that are formed in rotor core 101 at equal angular intervals. Each magnet hole 103*c* has circumferentially extending main portion and a pair of radial-outwardly extending end portions. Eight radial grooves 131 are also formed at equal angles in the inner periphery of rotor core 101 of outer rotor portion 10, so as to reduce leakage magnetic fluxes. Inner rotor portion 20 is a salient-induction-pole-type rotor as described above.

Flange member 106 is carried by shaft 1082, which is supported in the same manner as described above.

Other portions are substantially the same as those having the same reference numeral described above.

When outer rotor portion 10 rotates in synchronism with the rotating magnetic field of armature winding 202, inner rotor portion 20 is rotated by outer rotor portion 10 via shaft 1081, sun gear 502 planetary gear 504, planetary gear 505, sun gear 503, and shaft 1082.

Therefore, the effective magnetic flux supplied to armature winding 202 can be changed in the same manner as described above.

Figure 32:
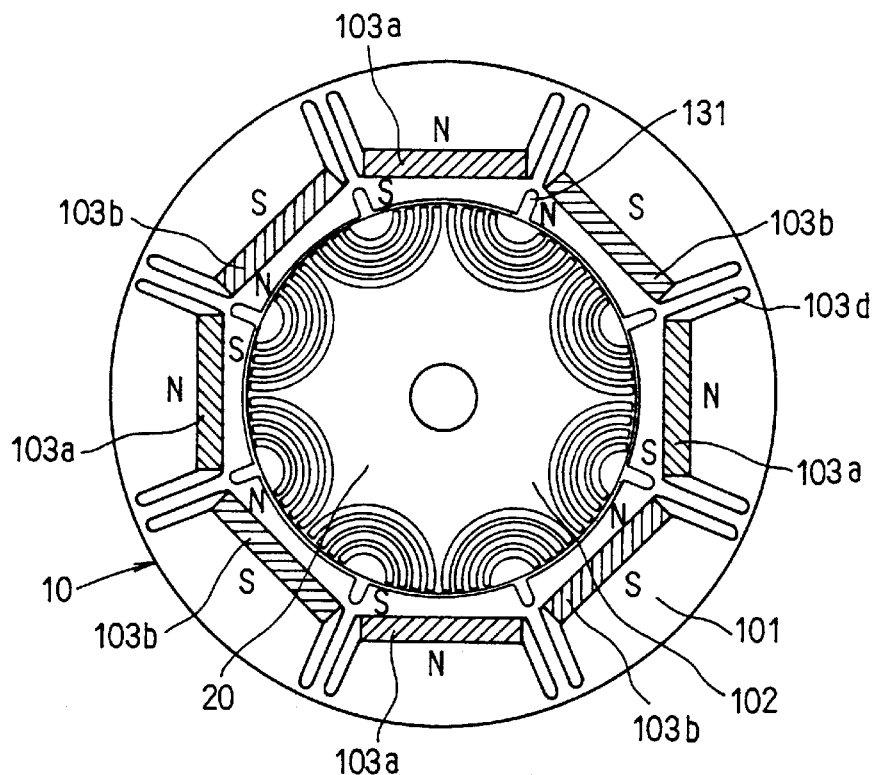
FIG. 32 is a schematic cross-sectional plan view of a rotor portion of the rotary electric machine according to the eighth embodiment.

If warm gear 701 does not rotate ring gear 507, outer rotor portion 10 and inner rotor portion 20 are located as shown in FIG. 32. Accordingly, a minimum short-circuit path is formed between neighboring poles so that a maximum effective magnetic flux is supplied to stator winding 202.

Figure 33:
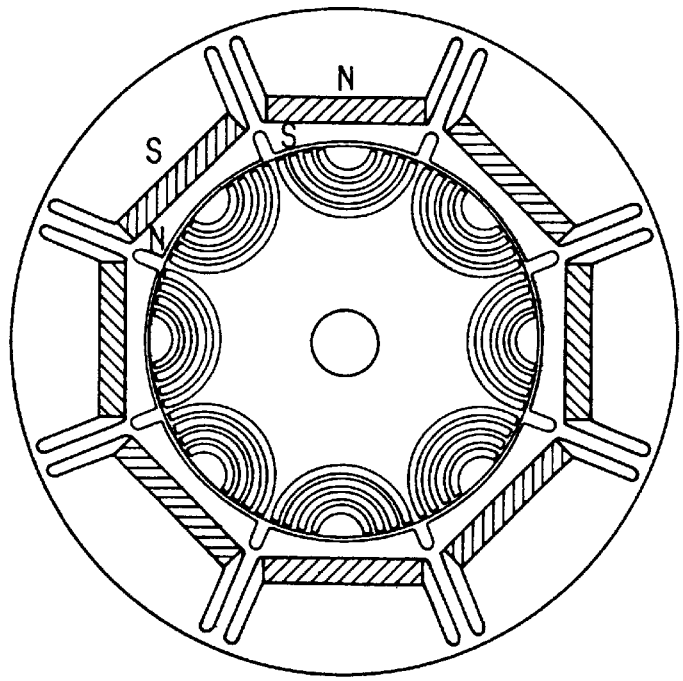
FIG. 33 is a schematic cross-sectional plan view of two rotor portions of the rotary electric machine according to the eighth embodiment.

On the other hand, if warm gear 701 rotates ring gear 507, sun gear 503 rotates inner rotor portion 20 relative to outer rotor portion 10, as shown in FIG. 33. Accordingly, a maximum short-circuit path is formed between neighboring poles so that a minimum effective magnetic flux is supplied to stator winding 202.

The rotary electric machine according to the eighth embodiment is mounted in a vehicle driving control system of a hybrid vehicle and controlled in the same manner as described above.

Figure 34:
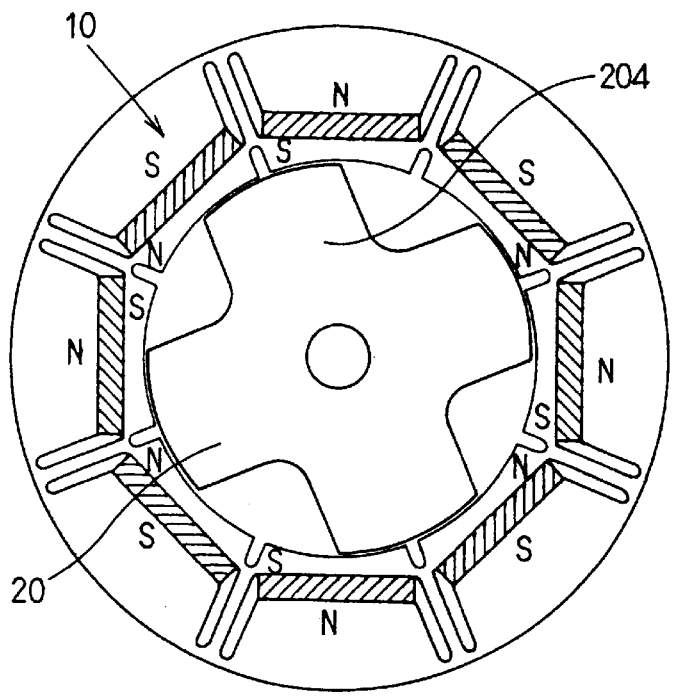
FIG. 34 is a schematic cross-sectional plan view of a variation of a rotor portion of the rotary electric machine according to the eighth embodiment.
Figure 35:
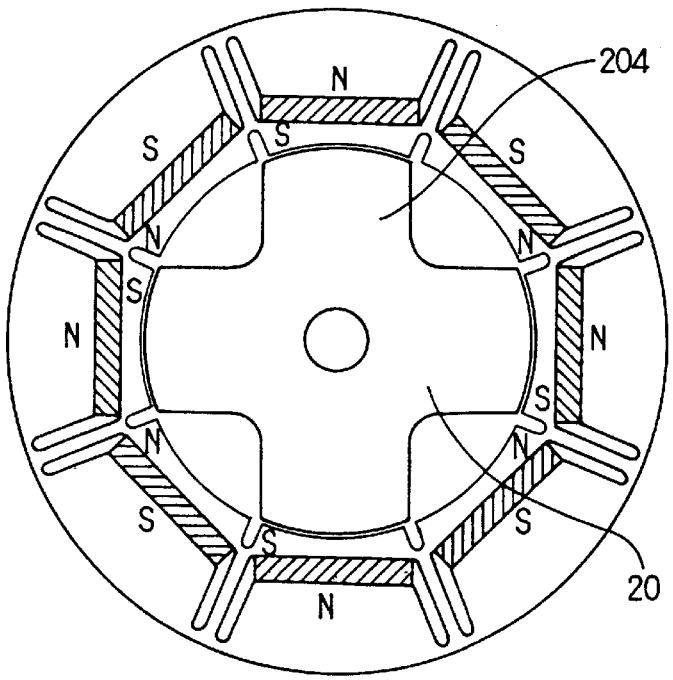
FIG. 35 is a schematic cross-sectional plan view of the variation of a rotor portion of the rotary electric machine according to the eighth embodiment.

The above-described structure of inner rotor portion 20 can be substituted by a structure shown in FIGS. 34 and 35. This inner rotor portion 20 has four salient core members 204.

If warm gear 701 does not rotate ring gear 507, outer rotor portion 10 and inner rotor portion 20 are disposed as shown in FIG. 34. Accordingly, a maximum short-circuit path is formed between neighboring poles so that a minimum effective magnetic flux is supplied to stator winding 202.

On the other hand, if warm gear 701 rotates ring gear 507, sun gear 503 rotates inner rotor portion 20 relative to outer rotor portion 10, as shown in FIG. 35, and a maximum effective magnetic flux is supplied to stator winding 202.

Figure 36:
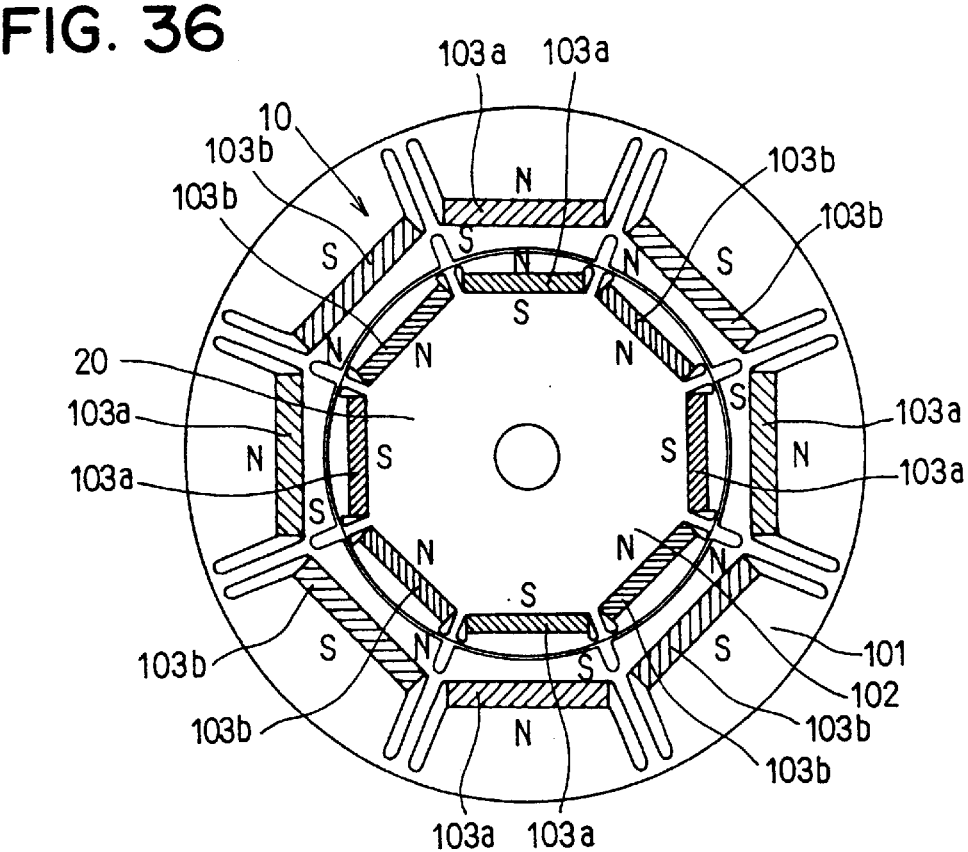
FIG. 36 is a schematic cross-sectional plan view of a variation of a rotor portion of the rotary electric machine according to the eighth embodiment.
Figure 37:
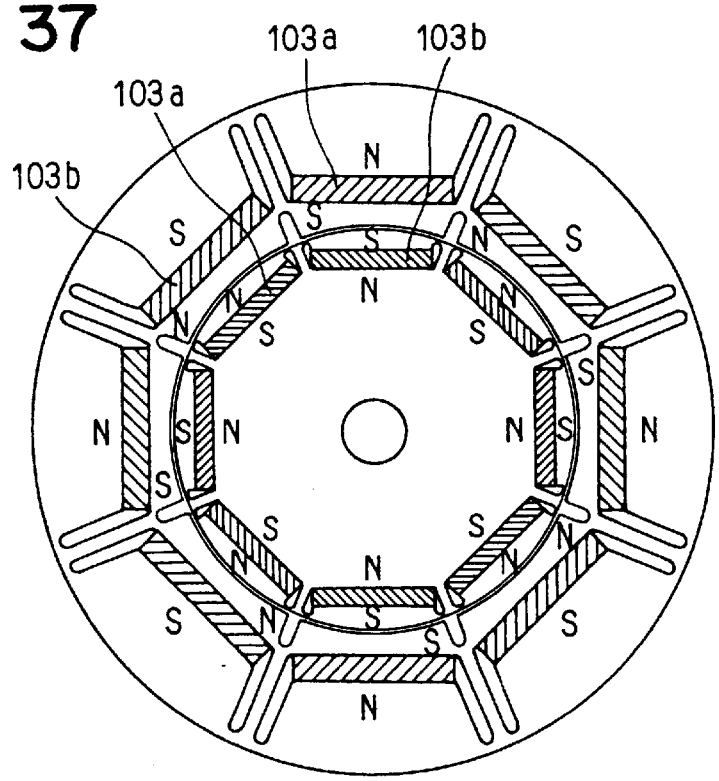
FIG. 37 is a schematic cross-sectional plan view of the variation of a rotor portion of the rotary electric machine according to the eighth embodiment.

The above-described structure of inner rotor portion 20 can be also substituted by a structure shown in FIGS. 36 and 37. This inner rotor portion 20 has eight radially-and alternately-polarized permanent magnets 103*a*, 103*b*, which are buried in magnet holes formed in rotor core 102 at equal circumferential intervals.

If warm gear 701 does not rotate ring gear 507, outer rotor portion 10 and inner rotor portion 20 are disposed as shown in FIG. 36. Accordingly, permanent magnets 103*a* and 103*b* of both outer and inner rotor portions 10 and 20 overlap in the radial direction to strengthen the magnetic force. As a result a maximum effective magnetic flux is supplied to armature winding 202.

On the other hand, if warm gear 701 rotates ring gear 507, sun gear 503 rotates inner rotor portion 20 relative to outer rotor portion 10, as shown in FIG. 37. Accordingly, permanent magnets 103a and 103b of both outer and inner rotor portions 10 and 20 overlap in the radial direction to offset the magnetic force each other. As a result, a minimum effective magnetic flux is supplied to armature winding 202. Thus, the effective magnetic flux can be properly controlled.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention is to be regarded in an illustrative, rather than a restrictive, sense.

What is claimed is:

1. A rotary electric machine, comprising:

a housing;

a stator core formed of laminated iron sheets and disposed in said housing, said stator core having a plurality of slots formed equally in a circumferential direction at the inner periphery thereof;

an armature winding having a plurality of in-slot portions respectively disposed in said slots; and a rotor disposed inside said inner periphery of said stator, said rotor including a first rotor portion and a second rotor portion disposed to be rotatable relative to each other and magnetically connected to said armature winding in parallel with each other, said first and second rotor portions respectively having a plurality of magnet poles, and a relative angle control mechanism that rotates one of said first rotor portion and second rotor portion at a prescribed angle to the other, thereby providing a controlled combined output torque.

2. The rotary electric machine as claimed in claim 1, wherein said first and second rotor portions are disposed side by side in an axial direction close to each other.

3. The rotary electric machine as claimed in claim 2, wherein said first and second rotor portions respectively have shafts coaxial to each other to rotate relative to each other, and said relative angle control mechanism is disposed between said shafts.

4. The rotary electric machine as claimed in claim 3, wherein said relative angle control mechanism comprises:

a pair of sun gears respectively fixed to said shafts of said first and second rotor portions;

a pair of planetary gears respectively engaged with said pair of sun gears;

a pair of ring gears respectively engaged with said pair of planetary gears; and a rotating mechanism fixed to said housing for rotating one of said pair of ring gears.

5. The rotary electric machine as claimed in claim 1, wherein said relative angle control mechanism comprises a planetary gear mechanism.

6. The rotary electric machine as claimed in claim 1, wherein said first and second rotor portions are disposed at radially opposite sides of said stator core to be coaxial with each other, and said relative angle control mechanism is disposed radially inner portion of said rotor.

7. The rotary electric machine as claimed in claim 1, wherein said plurality of magnet poles of said first and second rotor portions comprises a plurality of permanent magnets.

8. The rotary electric machine as claimed in claim 1, wherein said plurality of magnet poles of one of said first and second rotor portions comprises a plurality of permanent magnets, and said plurality of magnet poles of the other comprises a plurality of salient induction poles.

9. The rotary electric machine as claimed in claim 1, wherein said relative angle control mechanism rotates one of said first and second rotor portions so that said armature winding generates an output voltage lower than a threshold voltage.

* * * * *